US007155321B2

(12) United States Patent
Bromley et al.

(10) Patent No.: US 7,155,321 B2
(45) Date of Patent: Dec. 26, 2006

(54) SYSTEM, METHOD AND COMPUTER PROGRAM PRODUCT FOR REMOTE VEHICLE DIAGNOSTICS, MONITORING, CONFIGURING AND REPROGRAMMING

(75) Inventors: William Bromley, Lapeer, MI (US); Brian R. Carl, Rochester Hills, MI (US); Sam Chang, West Bloomfield, MI (US); Brian Crull, Clarkston, MI (US); Andrew Ditchfield, New Hudson, MI (US); Dennis Essenmacher, Royal Oak, MI (US); Michael Kapolka, Sterling Heights, MI (US)

(73) Assignee: IDSC Holdings LLC, Kenosha, WI (US)

( * ) Notice: Subject to any disclaimer, the term of this patent is extended or adjusted under 35 U.S.C. 154(b) by 0 days.

(21) Appl. No.: 10/344,976

(22) PCT Filed: Aug. 6, 2001

(86) PCT No.: PCT/US01/24616

§ 371 (c)(1),
(2), (4) Date: Nov. 10, 2003

(87) PCT Pub. No.: WO02/17184

PCT Pub. Date: Feb. 28, 2002

(65) Prior Publication Data

US 2004/0167689 A1 Aug. 26, 2004

(51) Int. Cl.
*G01M 17/00* (2006.01)
*G06F 7/00* (2006.01)

(52) U.S. Cl. .......................... 701/29; 701/33; 340/989; 340/993

(58) Field of Classification Search .................. 701/29, 701/30, 33, 35; 340/989, 997, 992, 993; 705/7
See application file for complete search history.

(56) References Cited

U.S. PATENT DOCUMENTS 4,067,061 A 1/1978 Juhasz ........................... 360/5
4,258,421 A 3/1981 Juhasz et al. ................. 701/35
4,630,292 A 12/1986 Judricich et al. ............. 377/20

(Continued)

FOREIGN PATENT DOCUMENTS

DE 44 23 328 1/1996

(Continued)

OTHER PUBLICATIONS

U.S. Appl. No. 09/640,785, filed Aug. 18, 2000, Bromley et al.

(Continued)

*Primary Examiner*—Thomas Black
*Assistant Examiner*—Brian J. Broadhead
(74) *Attorney, Agent, or Firm*—McDonnell Boehnen Hulbert & Berghoff LLP

(57) ABSTRACT

A remote vehicle diagnostics, monitoring, configuration and reprogramming tool is provided. The system includes a fleet of vehicles equipped with wireless mobile communications means that enable fleet managers to remotely diagnose, monitor and reprogram vehicles in their fleet via an Internet Web-based browser environment. Each vehicle within the fleet is equipped with a smart device that is coupled to the data bus within each vehicle. Date commands relating to the vehicle's parameters (e.g., diagnostic parameters such as max road speed, engine RPM, coolant temperature, air inlet temperature, etc.) are sent and received using satellite and terrestrial wireless communications technology. The invention allows users to remotely perform total fleet logistics and eliminates (or reduces) the need to physically bring fleet vehicles to a repair, maintenance or configuration facility.

35 Claims, 19 Drawing Sheets

U.S. PATENT DOCUMENTS

| | | | | |
|---|---|---|---|---|
| 4,677,429 | A | 6/1987 | Glotzbach | 345/168 |
| 4,809,177 | A | 2/1989 | Windle et al. | 701/1 |
| 4,926,331 | A | 5/1990 | Windle et al. | 701/35 |
| 4,939,652 | A | 7/1990 | Steiner | 701/35 |
| 4,979,170 | A | 12/1990 | Gilhousen et al. | 370/321 |
| 5,157,610 | A | 10/1992 | Asano et al. | 701/132 |
| 5,337,236 | A | 8/1994 | Fogg et al. | 701/35 |
| 5,359,528 | A | 10/1994 | Haendel et al. | 701/35 |
| 5,426,585 | A | 6/1995 | Stepper et al. | 702/85 |
| 5,442,553 | A | 8/1995 | Parrillo | 455/420 |
| 5,579,233 | A | 11/1996 | Burns | 700/240 |
| 5,581,464 | A | 12/1996 | Woll et al. | 701/35 |
| 5,612,875 | A | 3/1997 | Haendel et al. | 701/35 |
| 5,619,412 | A * | 4/1997 | Hapka | 701/36 |
| 5,648,768 | A | 7/1997 | Bouve | 340/988 |
| 5,680,328 | A | 10/1997 | Skorupski et al. | 701/35 |
| 5,682,317 | A | 10/1997 | Keeler et al. | 701/101 |
| 5,694,322 | A | 12/1997 | Westerlage et al. | 705/417 |
| 5,708,308 | A | 1/1998 | Katayama et al. | 307/10.5 |
| 5,721,678 | A | 2/1998 | Widl | 705/417 |
| 5,729,458 | A | 3/1998 | Poppen | 705/400 |
| 5,732,074 | A | 3/1998 | Spaur et al. | 370/313 |
| 5,742,915 | A | 4/1998 | Stafford | 701/35 |
| 5,787,373 | A | 7/1998 | Migues et al. | 701/33 |
| 5,803,043 | A | 9/1998 | Bayron et al. | 123/335 |
| 5,815,071 | A * | 9/1998 | Doyle | 340/439 |
| 5,815,822 | A | 9/1998 | Iu | 701/2 |
| 5,831,519 | A | 11/1998 | Pederson et al. | 340/425.5 |
| 5,835,376 | A | 11/1998 | Smith et al. | 701/117 |
| 5,835,868 | A | 11/1998 | McElroy et al. | 701/2 |
| 5,864,831 | A | 1/1999 | Schuessler | 705/417 |
| 5,917,434 | A | 6/1999 | Murphy | 340/991 |
| 5,919,239 | A | 7/1999 | Fraker et al. | 701/35 |
| 5,928,291 | A | 7/1999 | Jenkins et al. | 701/1 |
| 5,931,877 | A | 8/1999 | Smith et al. | 701/29 |
| 5,937,421 | A | 8/1999 | Petrov et al. | 707/526 |
| 5,938,716 | A | 8/1999 | Shutty et al. | 701/115 |
| 5,953,706 | A | 9/1999 | Patel | 705/6 |
| 5,954,773 | A | 9/1999 | Luper | 701/35 |
| 5,974,356 | A | 10/1999 | Doyle et al. | 701/209 |
| 5,974,396 | A | 10/1999 | Anderson | 705/10 |
| 5,999,876 | A | 12/1999 | Irons et al. | 701/115 |
| 6,008,740 | A | 12/1999 | Hopkins | 340/905 |
| 6,026,384 | A | 2/2000 | Poppen | 705/400 |
| 6,060,981 | A | 5/2000 | Landes | 340/426 |
| 6,064,929 | A | 5/2000 | Migues et al. | 701/35 |
| 6,078,873 | A | 6/2000 | Shutty et al. | 702/89 |
| 6,085,725 | A | 7/2000 | Goode et al. | 123/357 |
| 6,087,965 | A | 7/2000 | Murphy | 340/991 |
| 6,088,650 | A | 7/2000 | Schipper et al. | 701/27 |
| 6,089,207 | A | 7/2000 | Goode et al. | 123/357 |
| 6,091,340 | A | 7/2000 | Lee et al. | 340/825.31 |
| 6,292,724 | B1 * | 9/2001 | Apsell et al. | 701/29 |
| 6,295,492 | B1 * | 9/2001 | Lang et al. | 701/33 |
| 2001/0018628 | A1 | 8/2001 | Jenkins et al. | 701/35 |
| 2001/0020204 | A1 | 9/2001 | Runyon et al. | 701/35 |
| 2002/0007237 | A1 | 1/2002 | Phung et al. | 701/33 |
| 2002/0016655 | A1 | 2/2002 | Joao | 701/35 |
| 2002/0049523 | A1 | 4/2002 | Diaz et al. | 701/33 |
| 2002/0156558 | A1 | 10/2002 | Hanson et al. | 701/33 |
| 2002/0173885 | A1 | 11/2002 | Lowrey et al. | 701/29 |
| 2002/0177926 | A1 | 11/2002 | Lockwood et al. | 701/1 |
| 2003/0004624 | A1 | 1/2003 | Wilson et al. | 701/33 |
| 2003/0093199 | A1 | 5/2003 | Mavreas | 701/33 |
| 2003/0105565 | A1 | 6/2003 | Loda et al. | 701/33 |
| 2003/0158656 | A1 * | 8/2003 | David | 701/208 |
| 2004/0039504 | A1 | 2/2004 | Cofee et al. | 701/35 |
| 2005/0203673 | A1 | 9/2005 | El-Hajj et al. | 701/1 |

FOREIGN PATENT DOCUMENTS

| | | | |
|---|---|---|---|
| EP | 0 681 951 | A1 | 11/1995 |
| EP | 0 581 558 | B1 | 4/1997 |
| GB | 1 398 005 | | 6/1975 |
| GB | 2 288 892 | A | 11/1995 |
| GB | 2 340 974 | A | 3/2000 |
| KR | 0153605 | | 5/1997 |
| TW | 3 66 478 | | 8/1999 |
| WO | WO 03/077205 | | 9/2003 |

OTHER PUBLICATIONS

U.S. Appl. No. 10/082,847, filed Feb. 26, 2002, Kapolka et al.
U.S. Appl. No. 10/084,800, filed Feb. 27, 2002, Kapolka et al.
U.S. Appl. No. 10/091,096, filed Mar. 04, 2002, Kapolka et al.
U.S. Appl. No. 10/229,757, filed Aug. 28, 2002, Kapolka.
U.S. Appl. No. 10/709,500, filed May 10, 2004, Kapolka et al.
U.S. Appl. No. 10/823,271, filed Feb. 12, 2004, Kapolka et al.
U.S. Appl. No. 10/823,804, filed Apr. 12, 2004, Kapolka et al.
U.S. Appl. No. 10/358,637, filed Feb. 2003, Kapolka et al.
Korean Office Action mailed Nov. 16, 2004. (translation included).

* cited by examiner

| | | | |
|---|---|---|---|
| 07/24/2000 20:11:00 | DDEC 1 | Fault Code Alert | STATUS: ACTIVE; FLASH CODE: 82; PID: 98; FMI: 4; OIL LEVEL SENSOR INPUT VOLTAGE LOW |
| 07/24/2000 18:01:03 | DDEC 1 | Fault Code Alert | STATUS: ACTIVE; FLASH CODE: 82; PID:98;FMI:4; OIL LEVEL SENSOR INPUT VOLTAGE LOW |
| 07/28/2000 17:46:47 | DDEC 1 | Fault Code Alert | STATUS: ACTIVE; FLASH CODE: 82; PID:98;FMI:4; OIL LEVEL SENSOR INPUT VOLTAGE LOW |
| 07/21/2000 11:07:33 | DDEC 1 | Fault Code Alert | STATUS: ACTIVE; FLASH CODE: 82; PID:98;FMI:4; OIL LEVEL SENSOR INPUT VOLTAGE LOW |
| 07/21/2000 10:58:36 | DDEC 2 | Vehicle Speed Limit | Tamper Alert on VEHICLE SPEED LIMIT! Value changed from 70 mph to 80 mph. |
| 07/13/2000 12:12:37 | DDEC 2 | Fault Code Alert | STATUS: ACTIVE; FLASH CODE: 34; PID: 102; FMI: 4; TURBO BOOST SENSOR INPUT VOLTAGE LOW |
| 07/13/2000 12:12:28 | DDEC 2 | Vehicle Speed Limit | Tamper Alert on VEHICLE SPEED LIMIT! Value changed from 70 mph to 80 mph. |
| 07/10/2000 15:55:16 | DDEC 1 | Fault Code Alert | STATUS: ACTIVE; FLASH CODE: 82; PID:98;FMI:4; OIL LEVEL SENSOR INPUT VOLTAGE LOW |
| 05/25/2000 10:59:43 | DDEC 2 | Vehicle Speed Limit | Tamper Alert on VEHICLE SPEED LIMIT! Value changed from 70 mph to 80 mph. |
| 05/24/2000 16:54:34 | DDEC 2 | Vehicle Speed Limit | Tamper Alert on VEHICLE SPEED LIMIT! Value changed from 70 mph to 80 mph. |

Fig-4C

| | | | |
|---|---|---|---|
| 05/22/2000 11:11:47 | DDEC 2 | Vehicle Speed Limit | Tamper Alert on VEHICLE SPEED LIMIT! Value changed from 70 mph to 80 mph. |
| 05/22/2000 11:11:42 | DDEC 2 | Fault Code Alert | STATUS: ACTIVE; FLASH CODE: 34; PID:102;FMI:4; TURBO BOOST SENSOR INPUT VOLTAGE LOW |
| 05/21/2000 17:11:49 | DDEC 1 | Fault Code Alert | STATUS: ACTIVE; FLASH CODE: 82; PID:98;FMI:4; OIL LEVEL SENSOR INPUT VOLTAGE LOW |
| 05/21/2000 17:05:15 | DDEC 2 | Vehicle Speed Limit | Tamper Alert on VEHICLE SPEED LIMIT! Value changed from 70 mph to 80 mph. |
| 05/21/2000 17:05:10 | DDEC 2 | Fault Code Alert | STATUS: ACTIVE; FLASH CODE: 34; PID:102;FMI:4; TURBO BOOST SENSOR INPUT VOLTAGE LOW |

Fig-4D

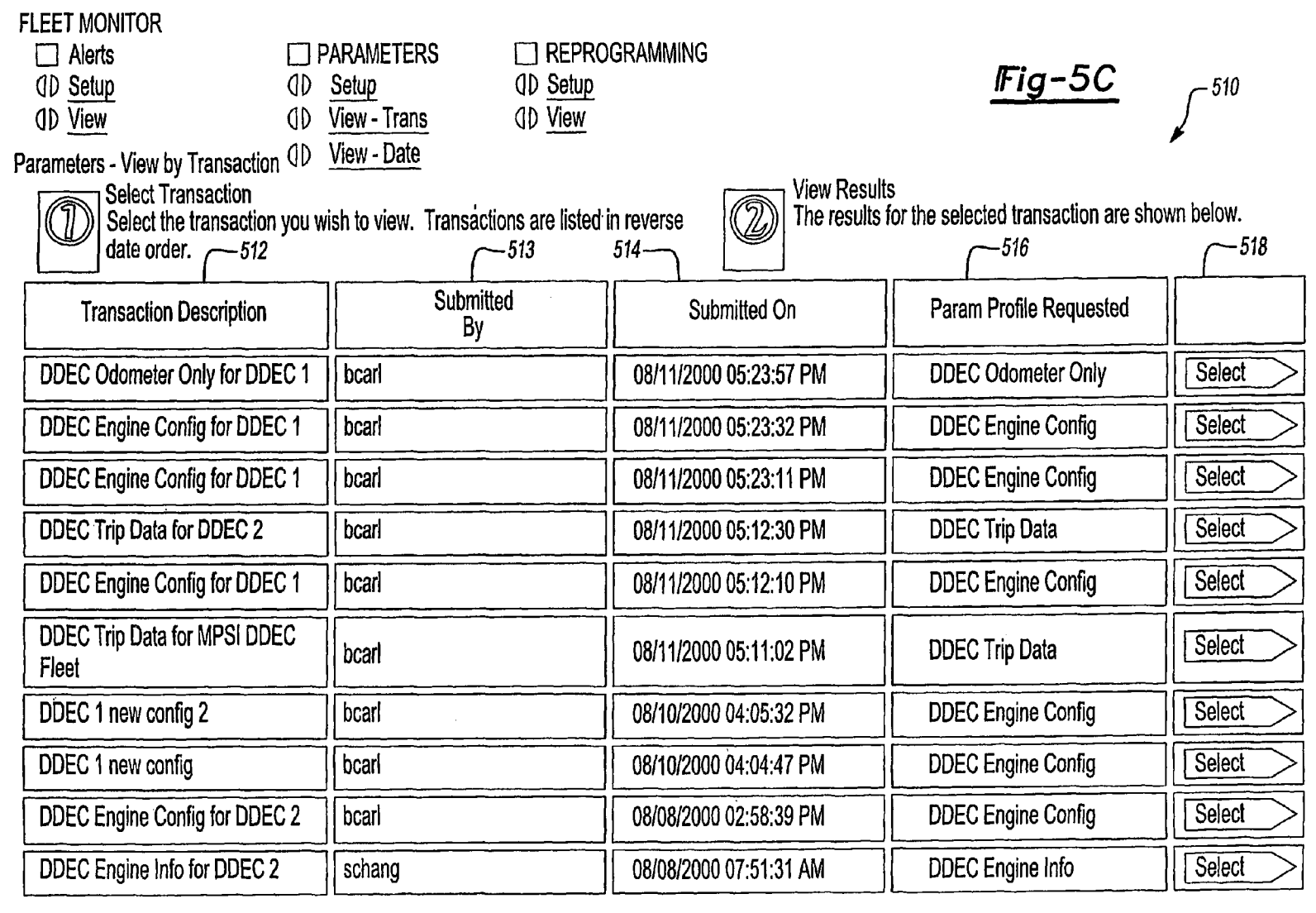

FLEET MONITOR
☐ Alerts
Setup
View

☐ PARAMETERS
Setup
View - Trans
View - Date

☐ REPROGRAMMING
Setup
View

Parameters - View by Transaction

① Select Transaction
Select the transaction you wish to view. Transactions are listed in reverse date order.

② View Results
The results for the selected transaction are shown below.

510

| Transaction Description (512) | Submitted By (513) | Submitted On (514) | Param Profile Requested (516) | (518) |
|---|---|---|---|---|
| DDEC Odometer Only for DDEC 1 | bcarl | 08/11/2000 05:23:57 PM | DDEC Odometer Only | Select |
| DDEC Engine Config for DDEC 1 | bcarl | 08/11/2000 05:23:32 PM | DDEC Engine Config | Select |
| DDEC Engine Config for DDEC 1 | bcarl | 08/11/2000 05:23:11 PM | DDEC Engine Config | Select |
| DDEC Trip Data for DDEC 2 | bcarl | 08/11/2000 05:12:30 PM | DDEC Trip Data | Select |
| DDEC Engine Config for DDEC 1 | bcarl | 08/11/2000 05:12:10 PM | DDEC Engine Config | Select |
| DDEC Trip Data for MPSI DDEC Fleet | bcarl | 08/11/2000 05:11:02 PM | DDEC Trip Data | Select |
| DDEC 1 new config 2 | bcarl | 08/10/2000 04:05:32 PM | DDEC Engine Config | Select |
| DDEC 1 new config | bcarl | 08/10/2000 04:04:47 PM | DDEC Engine Config | Select |
| DDEC Engine Config for DDEC 2 | bcarl | 08/08/2000 02:58:39 PM | DDEC Engine Config | Select |
| DDEC Engine Info for DDEC 2 | schang | 08/08/2000 07:51:31 AM | DDEC Engine Info | Select |

Fig-5C

| | | | | |
|---|---|---|---|---|
| DDEC Total Engine for MPSI DDEC Fleet | guest | 08/02/2000 11:32:06 PM | DDEC Total Engine | Select |
| DDEC Engine Config for DDEC 2 | bcarl | 08/02/2000 09:17:44 AM | DDEC Engine Config | Select |
| DDEC Engine Config for DDEC 1 | bcarl | 08/02/2000 09:17:32 PM | DDEC Engine Config | Select |
| DDEC Engine Config for MPSI DDEC Fleet | bcarl | 08/02/2000 09:17:18 AM | DDEC Engine Config | Select |
| Mack Engine Info for Mack 2 | bcarl | 08/02/2000 09:16:42 AM | Mack Engine Info | Select |
| DDEC Engine Config for DDEC 2 | bcarl | 08/02/2000 09:01:21 AM | DDEC Engine Config | Select |
| my description for this request | guest | 08/01/2000 03:31:20 PM | DDEC Engine Config | Select |
| DDEC Engine Config for DDEC 2 | bcarl | 07/28/2000 02:01:43 PM | DDEC Engine Config | Select |
| DDEC Engine Config for DDEC 2 | bcarl | 07/28/2000 02:01:31 PM | DDEC Engine Config | Select |
| DDEC Engine Config for DDEC 1 | bcarl | 07/28/2000 01:51:22 PM | DDEC Engine Config | Select |
| DDEC Engine Info for DDEC 1 | bcarl | 07/28/2000 01:49:22 PM | DDEC Engine Config | Select |
| DDEC Engine Config for DDEC 1 | bcarl | 07/28/2000 01:48:43 PM | DDEC Engine Config | Select |
| Mack Engine Info for Mack 1 | bcarl | 07/28/2000 01:33:35 PM | Mack Engine Info | Select |
| DDEC Engine Config for DDEC 1 | bcarl | 07/28/2000 01:33:05 PM | DDEC Engine Config | Select |
| DDEC Engine Config for DDEC 1 | bcarl | 07/28/2000 01:31:18 PM | DDEC Engine Config | Select |

Fig-5D

| | | | | | |
|---|---|---|---|---|---|
| DDEC Engine Config for DDEC 1 | bcarl | | 07/28/2000 01:28:58 PM | DDEC Engine Config | Select |
| DDEC Engine Config for DDEC 1 | bcarl | | 07/28/2000 01:25:58 PM | DDEC Engine Config | Select |
| DDEC Engine Config for DDEC 1 | bcarl | | 07/28/2000 01:24:16 PM | DDEC Engine Config | Select |
| DDEC Engine Config for DDEC 1 | bcarl | | 07/28/2000 10:37:55 AM | DDEC Engine Config | Select |
| DDEC Engine Config for DDEC 1 | bcarl | | 07/28/2000 10:34:52 AM | DDEC Engine Config | Select |
| DDEC Engine Config for DDEC 1 | bcarl | | 07/28/2000 10:33:33 AM | DDEC Engine Config | Select |
| DDEC Engine Config for DDEC 1 | bcarl | | 07/28/2000 10:25:34 AM | DDEC Engine Config | Select |

Fig-5E

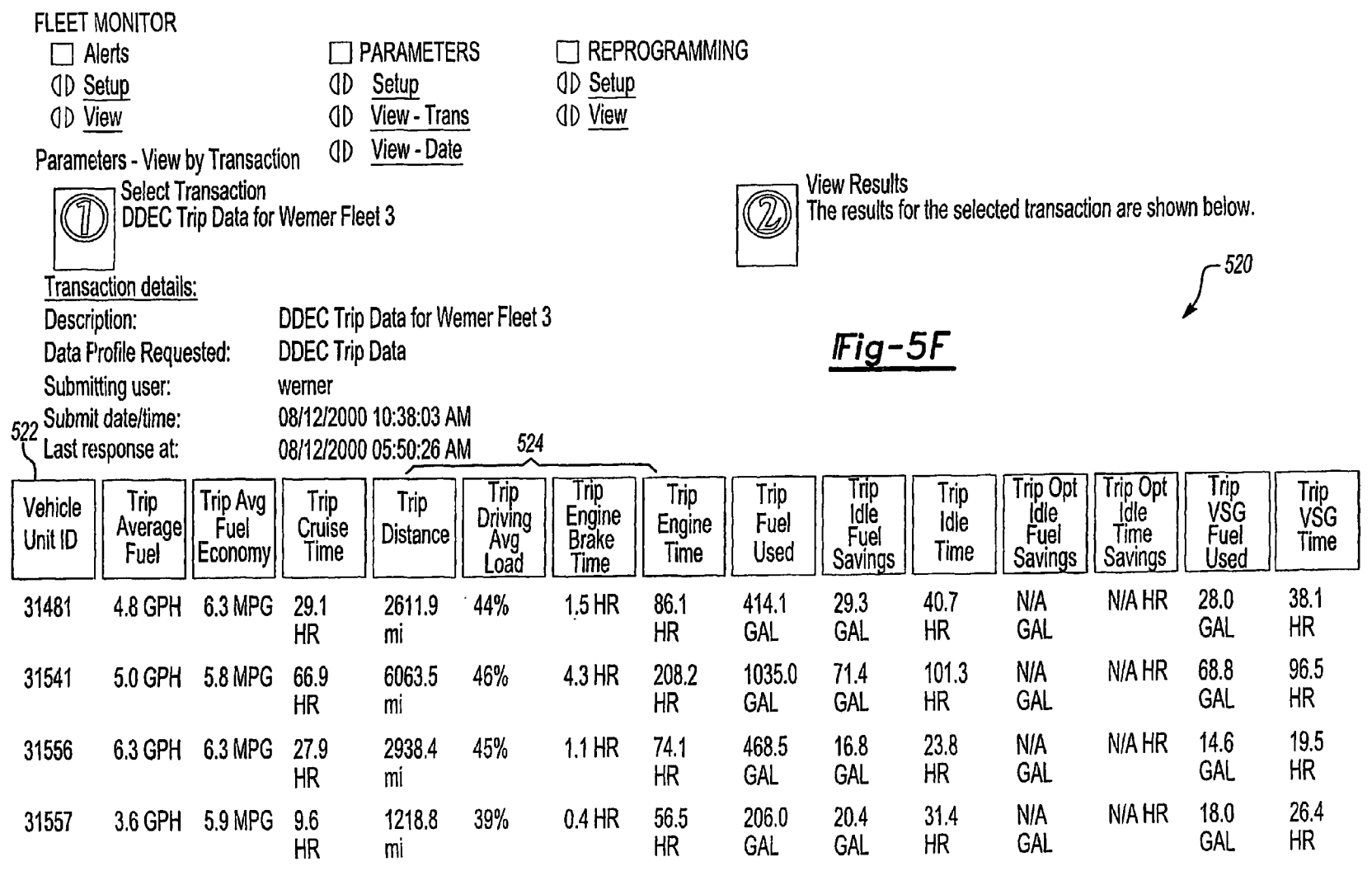

FLEET MONITOR

| | | |
|---|---|---|
| ☐ Alerts | ☐ PARAMETERS | ☐ REPROGRAMMING |
| Setup | Setup | Setup |
| View | View - Trans | View |
| | View - Date | |

Parameters - View by Transaction

① Select Transaction
DDEC Trip Data for Werner Fleet 3

② View Results
The results for the selected transaction are shown below.

520

Fig-5F

Transaction details:

| | |
|---|---|
| Description: | DDEC Trip Data for Werner Fleet 3 |
| Data Profile Requested: | DDEC Trip Data |
| Submitting user: | werner |
| Submit date/time: | 08/12/2000 10:38:03 AM |
| Last response at: | 08/12/2000 05:50:26 AM |

522 524

| Vehicle Unit ID | Trip Average Fuel | Trip Avg Fuel Economy | Trip Cruise Time | Trip Distance | Trip Driving Avg Load | Trip Engine Brake Time | Trip Engine Time | Trip Fuel Used | Trip Idle Fuel Savings | Trip Idle Time | Trip Opt Idle Fuel Savings | Trip Opt Idle Time Savings | Trip VSG Fuel Used | Trip VSG Time |
|---|---|---|---|---|---|---|---|---|---|---|---|---|---|---|
| 31481 | 4.8 GPH | 6.3 MPG | 29.1 HR | 2611.9 mi | 44% | 1.5 HR | 86.1 HR | 414.1 GAL | 29.3 GAL | 40.7 HR | N/A GAL | N/A HR | 28.0 GAL | 38.1 HR |
| 31541 | 5.0 GPH | 5.8 MPG | 66.9 HR | 6063.5 mi | 46% | 4.3 HR | 208.2 HR | 1035.0 GAL | 71.4 GAL | 101.3 HR | N/A GAL | N/A HR | 68.8 GAL | 96.5 HR |
| 31556 | 6.3 GPH | 6.3 MPG | 27.9 HR | 2938.4 mi | 45% | 1.1 HR | 74.1 HR | 468.5 GAL | 16.8 GAL | 23.8 HR | N/A GAL | N/A HR | 14.6 GAL | 19.5 HR |
| 31557 | 3.6 GPH | 5.9 MPG | 9.6 HR | 1218.8 mi | 39% | 0.4 HR | 56.5 HR | 206.0 GAL | 20.4 GAL | 31.4 HR | N/A GAL | N/A HR | 18.0 GAL | 26.4 HR |

| | | | | | | | | | | | | | | |
|---|---|---|---|---|---|---|---|---|---|---|---|---|---|---|
| 31632 | 5.3 GPH | 6.3 MPG | 15.9 HR | 3106.7 mi | 43% | 3.5 HR | 92.8 HR | 494.0 GAL | 28.1 GAL | 37.6 HR | N/A GAL | N/A HR | 27.6 GAL | 36.3 HR |
| 31635 | 3.9 GPH | 5.8 MPG | 13.7 HR | 1693.5 mi | 45% | 1.3 HR | 74.8 HR | 289.9 GAL | 22.9 GAL | 44.0 HR | N/A GAL | N/A HR | 20.9 GAL | 40.9 HR |
| 31636 | 4.3 GPH | 6.4 MPG | 8.0 HR | 951.4 mi | 42% | 0.7 HR | 34.3 HR | 148.8 GAL | 12.6 GAL | 17.8 HR | N/A GAL | N/A HR | 12.3 GAL | 17.0 HR |
| 31637 | 4.0 GPH | 5.3 MPG | 9.6 HR | 1923.6 mi | 47% | 0.7 HR | 91.2 HR | 360.9 GAL | 40.9 GAL | 56.8 HR | N/A GAL | N/A HR | 39.9 GAL | 55.0 HR |
| 31638 | 6.3 GPH | 7.3 MPG | 50.4 HR | 3760.0 mi | 40% | 0.6 HR | 81.4 HR | 515.1 GAL | 8.5 GAL | 13.0 HR | N/A GAL | N/A HR | 7.6 GAL | 11.4 HR |
| 31639 | 4.7 GPH | 6.7 MPG | 15.3 HR | 2906.4 mi | 42% | 0.1 HR | 92.3 HR | 435.3 GAL | 21.4 GAL | 42.0 HR | N/A GAL | N/A HR | 19.6 GAL | 39.1 HR |
| 31642 | 3.8 GPH | 5.1 MPG | 15.5 HR | 1675.2 mi | 50% | 0.0 HR | 85.1 HR | 326.5 GAL | 33.1 GAL | 55.3 HR | N/A GAL | N/A HR | 31.8 GAL | 52.8 HR |

Fig-5G

| | | | |
|---|---|---|---|
| 31599 | Freightliner Classic XL 2000 | Unknown | |
| 31632 | Freightliner Classic XL 2000 | 64 mph | |
| 31635 | Freightliner Classic XL 2000 | 66 mph | |
| 31636 | Freightliner Classic XL 2000 | 64 mph | |
| 31637 | Freightliner Classic XL 2000 | 65 mph | |
| 31638 | Freightliner Classic XL 2000 | 65 mph | |
| 31639 | Freightliner Classic XL 2000 | 65 mph | |
| 31642 | Freightliner Classic XL 2000 | 65 mph | |

Submit

Fig-6B

Fig-6C

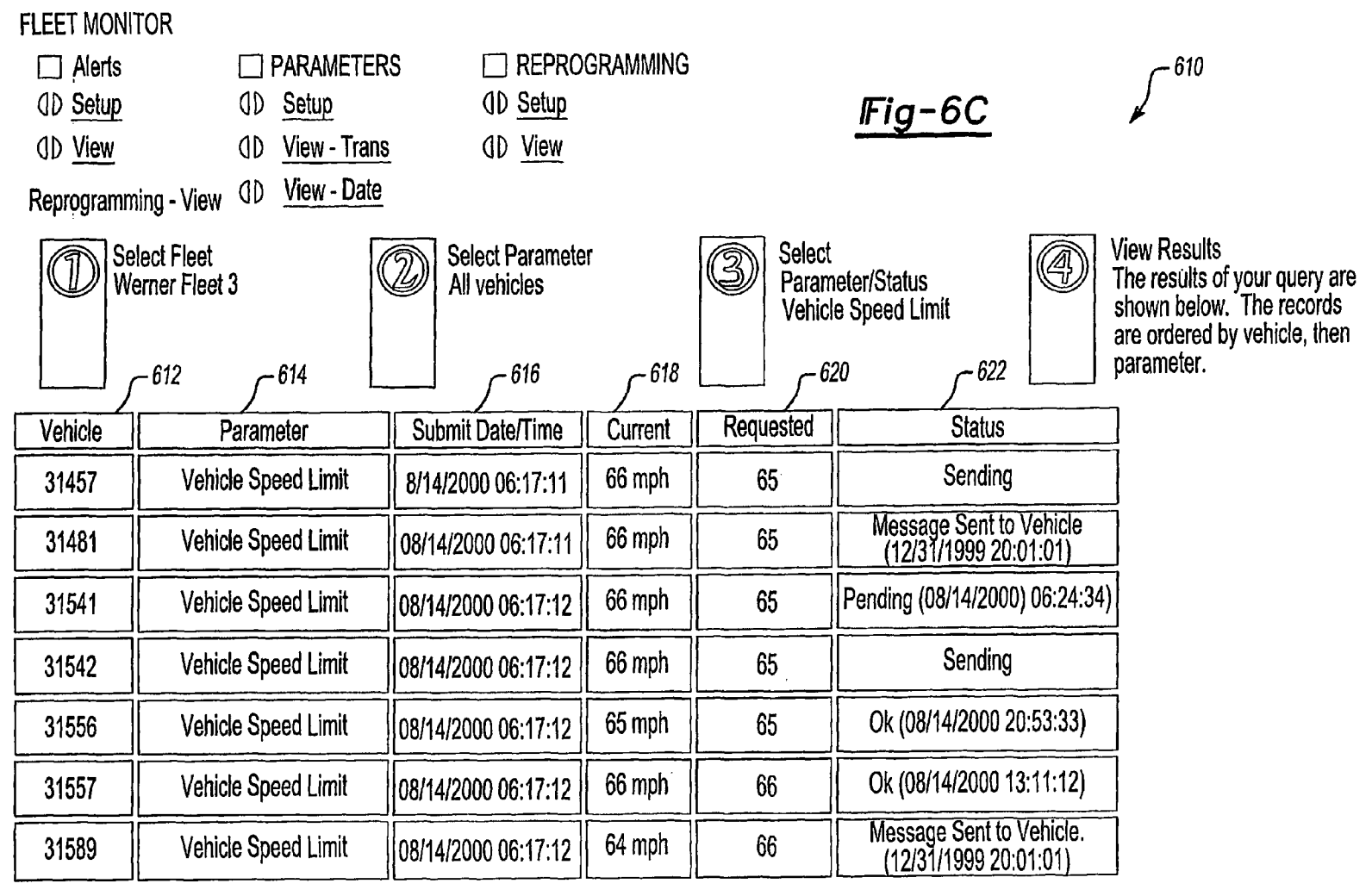

610

FLEET MONITOR

| | | |
|---|---|---|
| ☐ Alerts | ☐ PARAMETERS | ☐ REPROGRAMMING |
| Setup | Setup | Setup |
| View | View - Trans | View |
| Reprogramming - View | View - Date | |

① Select Fleet
Werner Fleet 3

② Select Parameter
All vehicles

③ Select
Parameter/Status
Vehicle Speed Limit

④ View Results
The results of your query are shown below. The records are ordered by vehicle, then parameter.

| Vehicle (612) | Parameter (614) | Submit Date/Time (616) | Current (618) | Requested (620) | Status (622) |
|---|---|---|---|---|---|
| 31457 | Vehicle Speed Limit | 8/14/2000 06:17:11 | 66 mph | 65 | Sending |
| 31481 | Vehicle Speed Limit | 08/14/2000 06:17:11 | 66 mph | 65 | Message Sent to Vehicle (12/31/1999 20:01:01) |
| 31541 | Vehicle Speed Limit | 08/14/2000 06:17:12 | 66 mph | 65 | Pending (08/14/2000) 06:24:34) |
| 31542 | Vehicle Speed Limit | 08/14/2000 06:17:12 | 66 mph | 65 | Sending |
| 31556 | Vehicle Speed Limit | 08/14/2000 06:17:12 | 65 mph | 65 | Ok (08/14/2000 20:53:33) |
| 31557 | Vehicle Speed Limit | 08/14/2000 06:17:12 | 66 mph | 66 | Ok (08/14/2000 13:11:12) |
| 31589 | Vehicle Speed Limit | 08/14/2000 06:17:12 | 64 mph | 66 | Message Sent to Vehicle. (12/31/1999 20:01:01) |

| | | | | | |
|---|---|---|---|---|---|
| 31599 | Vehicle Speed Limit | 08/14/2000 06:17:12 | Unknown | 66 | Message Sent to Vehicle (12/31/1999 20:01:01) |
| 31632 | Vehicle Speed Limit | 08/14/2000 06:17:12 | 84 mph | 66 | Pending (08/14/2000 07:45:27) |
| 31635 | Vehicle Speed Limit | 08/14/2000 06:17:12 | 66 mph | 66 | Ok (08/14/2000 12:36:39) |
| 31636 | Vehicle Speed Limit | 08/14/2000 06:17:12 | 64 mph | 65 | Message Sent to Vehicle (12/31/1999 20:01:01) |
| 31637 | Vehicle Speed Limit | 08/14/2000 06:17:12 | 65 mph | 65 | Ok (08/14/2000 14:05:18) |
| 31638 | Vehicle Speed Limit | 08/14/2000 06:17:12 | 65 mph | 65 | Ok (08/14/2000 09:23:07) |
| 31639 | Vehicle Speed Limit | 08/14/2000 06:17:12 | 65 mph | 65 | Ok (08/14/2000 11:55:48) |
| 31642 | Vehicle Speed Limit | 08/14/2000 06:17:12 | 65 mph | 65 | Message Sent to Vehicle. (12/31/1999 20:01:01) |

Fig-6D

SYSTEM, METHOD AND COMPUTER PROGRAM PRODUCT FOR REMOTE VEHICLE DIAGNOSTICS, MONITORING, CONFIGURING AND REPROGRAMMING

PRIORITY

The present application is a United States national stage application claiming the benefit of PCT/US01/24616, filed on Aug. 6, 2001, which claims the benefit of U.S. application Ser. No. 09/640,785, filed on Aug. 21, 2000, now abandoned.

FIELD OF THE INVENTION

The present invention relates generally to computer data and information systems, and more particularly to computer tools for storing, processing, and displaying fleet vehicle information.

RELATED ART

In today's business environment, it is common for companies to own a large amount (i.e., a fleet) of motor vehicles. A company, depending on their particular line of business, may have a fleet of passenger cars, light trucks, vans, heavy trucks or any combination of theses types of vehicles. Typical examples of such companies include commercial courier services, moving companies, freight and trucking companies, as well as passenger vehicle leasing companies and passenger carriers.

Such companies must typically manage each of the hundreds of vehicle within their fleets. The most critical management operations include the maintenance and repair, and maximizing the efficiency of these vehicles. In addition, timely reporting of key information related to the vehicle, such as mileage, trip information, fluid status, and other parameters must be available in a timely fashion. In order to maximize profits, a company must maximize the amount of time each vehicle spends performing its intended function. That is, a company must minimize the amount of time each vehicle spends in a service environment (i.e., a repair and maintenance facility). Further complicating the situation is the fact that the vehicles within a company's fleet may operate throughout the nation's roads, but repair and maintenance facilities and vehicle configuration facilities are sparsely located in certain geographic locations.

One management technique has traditionally been to schedule vehicles for routine inspections on a rotating basis. While this technique has improved efficiency somewhat, it still involves taking a percentage of the fleet's vehicles out of service when in fact, they may not need to be in a service environment or may not be available to be serviced or configured.

One development has led to the decrease in the amount of time vehicles needed to be in the service environment during routine inspections. That is, during the '70s and early 1980's manufacturers started using electronic means to control engine functions and diagnose engine problems. This effort was primarily motivated to meet new and tougher Environmental Protection Agency (EPA) emission standards. Nevertheless, onboard diagnostic systems eventually became more sophisticated. Vehicles today typically include several controllers attached to a vehicle data bus that allow the engine and parts of the vehicle's chassis, body and accessory devices to be monitored.

Several instruments were designed to take advantage of vehicles onboard diagnostic and control systems. First, there were large pieces of equipment to perform diagnostics and these were followed by hand-held devices. These instruments increased the speed and efficiency of vehicle maintenance and configuration. Such instruments, however, did not eliminate the need for vehicles, which may be operating nation-wide, to be brought to a centralized (or regional) repair and maintenance facility. That is, these devices needed to be connected directly to the vehicle. Further, there still has not been any systematic way for companies to remotely diagnose, monitor or configure their fleet's vehicles. That is, routine maintenance or configuration on a rotating basis is arbitrary and not based on which specific vehicles really require service.

Therefore, given the above, what is needed is a system, method, and computer program product for remote vehicle diagnostics, monitoring, configuring and reprogramming. The system, method, and computer program product should allow fleet managers, without heavy infrastructure additions, to take advantage of today's vehicle's onboard diagnostic systems, computer advances, and mobile communications in order to remotely diagnose, monitor and reprogram their fleet's vehicles.

SUMMARY OF THE INVENTION

The present invention meets the above-mentioned needs by providing a system, method, and computer program product for remote vehicle diagnostics, monitoring, configuring and reprogramming.

The system of the present invention allows a user to perform total fleet logistics by facilitating vehicle parameter changes, vehicle health tracking, and receipt of vehicle maintenance need indications, thus eliminating the need to physically bring vehicles to a repair and maintenance facility. More specifically, the system includes a plurality of vehicles each having an onboard unit as described herein. The onboard unit is coupled to the vehicle data bus of each of the plurality of vehicles, which in turn is connected to the vehicle's several controllers.

The system further includes an application server which provides the user with a graphical user interface (GUI) (e.g., Web pages over the Internet) in order to send and receive data from each of the plurality of vehicles. A repository database, accessible via the application server, is also included which stores information related to the subscribers of the system and the specifics in relation to the vehicles in their fleet.

An onboard unit server, coupled to the application server, is also included which contains means to convert command data between a format understandable by the user using the GUI (e.g., change max cruise speed to 55 MPH") and a format understandable by the vehicle data bus of each of the plurality of vehicles (e.g., a binary data stream). Finally, the system includes a communications means, coupled to the onboard unit server, for handling (mobile) communications between the onboard unit server and the onboard units located on each of the plurality of vehicles.

The method and computer program product of the present invention includes the steps of accessing the repository database in order to provide the user with a list of specific vehicles within the fleet and the vehicles' associated vehicle parameters. Next, a command from the user is received via the GUI. The command typically includes information specifying at least one vehicle within the fleet and at least one vehicle parameter. Then, the command is stored in the repository database along with the time and date that the command was received from the user. Next, the command is converted from a format understandable by the user using the GUI, to a format understandable by the vehicle data bus of the at least one vehicle within the fleet.

The method and computer program product of the present invention further includes sending the command, via a wireless mobile communications system to the onboard unit located on the targeted vehicle within the fleet. This causes the previously specified vehicle parameter to be read or changed (depending on whether, for example, the command was related to diagnostic or reprogramming activities respectively). Next, an acknowledgment of the command is received from the vehicle via the wireless mobile communications system. Finally, the acknowledgment is stored in the repository database so that the user may later retrieve it using the GUI.

One advantage of the present invention is that it allows a large fleet (e.g., several hundred) of commercial vehicles (e.g., a fleet of commercial delivery vans and/or trucks), of different makes and models, to be remotely configured, monitored, re-calibrated, and diagnosed without having to be brought to a centralized location (e.g., company headquarters). That is, the present invention provides a means for obtaining "total population" vehicle information.

Another advantage of the present invention is that it provides tampering alert notification should any vehicle parameter be changed without authorization once the vehicle leaves a company location or headquarters.

Another advantage of the present invention is that it provides users (e.g., fleet managers, vehicle distributors, vehicle dealers and the like) with a consistent graphical user interface, regardless of the vehicle makes and models that comprise their fleet.

Another advantage of the present invention is that it enables users to obtain real-time fleet characteristics, trend analysis and diagnostics, as well as allow fleet managers to provide real-time driver/fleet notification.

Yet another advantage of the present invention is that it allows parametric data capture, diagnostic code capture, trip data capture, system reconfiguration, system re-calibration, and correlation analysis to be performed on a fleet of vehicles on a customer-specified schedule.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIGS. 4A–4D are windows or screen shots, relating to vehicle alerts, generated by the graphical user interface of the present invention;

FIGS. 5A–5G are windows or screen shots, relating to vehicle parameter readings, generated by the graphical user interface of the present invention;

FIGS. 6A–6D are windows or screen shots, relating to vehicle parameter reprogramming, generated by the graphical user interface of the present invention.

DETAILED DESCRIPTION OF THE PREFERRED EMBODIMENTS

Table of Contents

Figure 1:
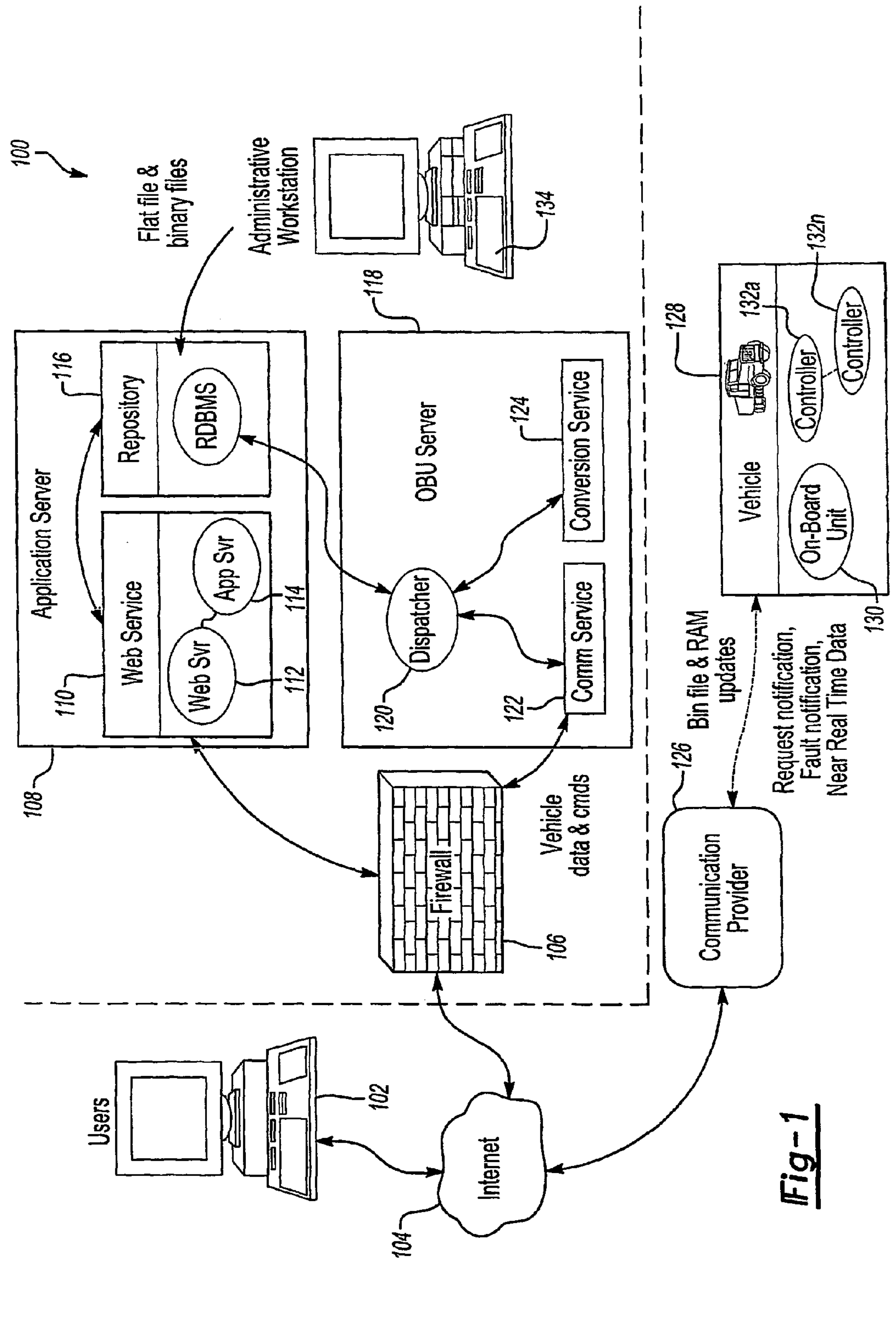
FIG. 1 is a block diagram illustrating the system architecture of an embodiment of the present invention, showing connectivity among the various components.

I. Overview
II. System Architecture
III. On Board Units
IV. Detailed Example of System Operation
V. Graphical User Interface
VI. Example Implementations
VII. Conclusion

I. Overview

The present invention relates to a system, method, and computer program product for remote commercial vehicle diagnostics, monitoring, configuring and reprogramming. The remote vehicle diagnostics, monitoring, configuration and reprogramming tool described herein will become essential to any business concern which deals with commercial fleet maintenance and service operations (i.e., it is a "total fleet logistics" tool).

In an embodiment of the present invention, an application service provider provides and allows access, on a subscriber basis, to a remote vehicle diagnostics, monitoring, configuration and reprogramming tool via the global Internet. That is, the application service provider would provide the hardware (e.g., servers) and software (e.g., database) infrastructure, application software, customer support, and billing mechanism to allow its customers (e.g., fleet managers, vehicle distributors, vehicle dealers, original equipment manufacturers (OEM), leasing/rental companies, and the like) to remotely diagnose, monitor, configure and/or reprogram, as appropriate, the vehicles within a fleet. The tool would be used by subscribers to obtain real-time fleet characteristics, trend analysis and diagnostics, to perform manual, dynamic or rule based configuration, as well as allow fleet managers to provide real-time driver/fleet notification.

More specifically, the application service provider would provide a World Wide Web site where a fleet manager, using a computer and Web browser software, to remotely diagnose, monitor, configure, and/or reprogram the commercial vehicles for which they are responsible. Such fleet managers would include, for example, those responsible for overseeing a fleet of trucks for a commercial trucking or delivery company. Other users of the remote vehicle diagnostics, monitoring, configuring, and reprogramming tool would also include vehicle dealers, OEMs, and distributors who wish to obtain data concerning the performance of the vehicles within a fleet for "market intelligence" or "improved performance" purposes.

In an alternate embodiment, the remote vehicle diagnostics, monitoring, configuring and reprogramming tool of the present invention maybe run, instead of on the global Internet, locally on proprietary equipment owned by the customers (i.e., the fleet managers, vehicle distributors, vehicle dealers and the like) as a stand alone software application. In yet another embodiment, users may access the remote vehicle diagnostics, monitoring, configuring and reprogramming tool of the present invention via direct dial-up lines rather than through the global Internet.

The remote vehicle diagnostics, monitoring, configuring, and reprogramming tool of the present invention would be utilized, as suggested above, by fleet manager users, for example, in order to facilitate vehicle parameter changes, track vehicle health, and/or receive indications of vehicle maintenance needs.

In an alternate embodiment, the remote vehicle diagnostics, monitoring, configuring and reprogramming tool of the present invention would be utilized by a vehicle component suppliers to re-calibrate any vehicle component, perform firmware downloads, perform component failure analysis, and determine wear characteristics.

In an alternate embodiment, the remote vehicle diagnostics, monitoring, configuring and reprogramming tool of the present invention would be utilized by vehicle manufacturers to analyze quality of components (and thus, suppliers) utilized in their manufacturing processes, and/or retrieve and manage warranty information.

In yet another embodiment, the remote vehicle diagnostics, monitoring, configuring and reprogramming tool of the present invention would be utilized by vehicle leasing companies to receive indications of vehicle maintenance needs, monitor vehicle use and abuse, and/or monitor lessee trip information.

In yet another alternate embodiment, the remote vehicle diagnostics, monitoring and reprogramming tool of the present invention would be utilized by vehicle dealers or vehicle repair facility personnel to perform proactive data analysis, perform pre-arrival diagnostics, re-calibrate vehicle components, and/or perform firmware downloads.

The present invention is described in terms of the above examples. This is for convenience only and is not intended to limit the application of the present invention. In fact, after reading the following description, it will be apparent to one skilled in the relevant art(s) how to implement the following invention in alternative embodiments (e.g., to remotely manage different types and different aspects of vehicles—non-commercial or commercial, etc.).

The terms "user," "subscriber," "company," "business concern," and the plural form of these terms are used interchangeably throughout herein to refer to those who would access, use, and/or benefit from the remote vehicle diagnostics, monitoring and reprogramming tool of the present invention.

II. System Architecture

Referring to FIG. 1, a block diagram illustrating the physical architecture of a total fleet logistics ("TFL") system 100, according to an embodiment of the present invention. FIG. 1 also shows network connectivity among the various components.

The TFL system 100 includes a plurality of users 102 (e.g., fleet managers, vehicle distributors, OEMs, vehicle dealers and the like) which would access to system 100 using a personal computer (PC) (e.g., an IBM™ or compatible PC workstation running the Microsoft® Windows 95/98™ or Windows NT™ operating system, Macintosh® computer running the Mac® OS operating system, or the like), running a commercially available Web browser. In alternative embodiments, users 102 may access TFL system 100 using any processing device including, but not limited to, a desktop computer, laptop, palmtop, workstation, set-top box, personal data assistant (PDA), and the like.

The users 102 would connect to the parts (i.e., infrastructure) of the TFL system 100 which are provided by the TFL application service provider (i.e., elements 106–124 of FIG. 1) via the global Internet 104. The connection to the Internet 104, however, is through a firewall 106. The components of the TFL system 100 are divided into two regions—"inside" and "outside." The components in the "inside" region refer to those components that the TFL application service provider would have as part of their infrastructure in order to provide the tools and services contemplated by the present invention. As will be apparent to one skilled in the relevant art(s), all of components "inside" of the TFL system 100 are connected and communicate via a wide or local area network (WAN or LAN) running a secure communications protocol (e.g., secure sockets layer (SSL)). The firewall 106 serves as the connection and separation between the LAN, which includes the plurality of elements (e.g., elements 108–124) "inside" of the LAN, and the global Internet 104 "outside" of the LAN. Generally speaking, a firewall is a dedicated gateway machine (e.g., a SUN Ultra 10) with special security precaution software. It is typically used, for example, to service Internet 104 connections and dial-in lines, and protects the cluster of more loosely administered network elements hidden behind it from external invasion. Firewalls are well known in the relevant art(s) and firewall software is available from many vendors such as Check Point Software Technologies Corporation of Redwood City, Calif.

TFL system 100 also includes two servers—an application server 108 and an onboard unit server ("OBU") 118.

The application server 108 is the "back-bone" (i.e., TFL processing) of the present invention. It provides the "front-end" for the TFL system 100. That is, application server 108 includes a Web service 110 which is a typical Web server process running at a Web site which sends out Web pages in response to Hypertext Transfer Protocol (HTTP) requests from remote browsers (i.e., subscribers 102 of the TFL application service provider ). More specifically, a Web server 112 provides graphical user interface (GUI) "front-end" screens to users 102 of the TFL system 100 in the form of Web pages. These Web pages, when sent to the subscriber's PC (or the like), would result in GUI screens being displayed. In an embodiment of the present invention, the server 112 would be implemented using a Netscape Enterprise or compatible Web server, an Apache web server or the like. Connected to the server 112 is an application server 114 which facilitates the data and commands between a repository database 116 and the Web pages on Web server 112. In an embodiment of the present invention, the server 114 would be an Oracle application server.

Also included in the application server 108 is a TFL repository database 116. Database 116, in an embodiment of the present invention, is a Sun E250 machine running the Oracle 8iRDBMS (relational database management server) software. The database 116 is the central store for all information within the TFL system 100 and also stores Web page executable code (e.g., PL/SQL and HTML).

The OBU server 118 is responsible, generally, for routing data between the smart device onboard units 130 within each vehicle (explained in detail below) and the application server 108. The OBU server 118 includes three software modules, implemented in a high level programming language such as the C++ programming language—a dispatcher 120, a communications service 122, and a conversion service 124. The dispatcher 120 is a software module resident on the OBU server 118 and is responsible for serving as an intermediary to route messages between the remaining two components of the OBU server 118 (i.e., the communications service 122 and the conversion service 124).

The communications service 122 is a module that contains software code logic that is responsible for handling in-bound and out-bound vehicle data and commands. As will be described in more detail below, the communications service 122 is configured for the specific means of mobile communications employed within TFL system 100 (e.g., satellite or terrestrial wireless).

The conversion service 124 is a module that contains software code logic that is responsible for converting raw vehicle data (i.e., telemetry) into human-readable format, and vice-versa. In an embodiment of the present invention, the conversion service 124 module includes a relational database implemented in Microsoft® Access or the like which stores telemetry data definitions for a plurality of vehicle makes, models, and associated components. Such definitions would include vehicle component masks, bit length, and data stream order definitions for various vehicle (and component) manufacturers in order to perform the binary (raw) data conversion into human-readable form, and vice-versa.

TFL system 100 also includes an administrative workstation 134. This workstation can be used by personnel of the TFL application service provider to upload, update, and maintain subscriber information (e.g., logins, passwords, etc.) and fleet-related data for each of the users 102 that subscribe to the TFL system 100. The administrative workstation 134 may also be used to monitor and log statistics related to the application server 108 and system 100 in general. Also, the administrative workstation 134 may be used "off-line" by subscribers 102 of the TFL system 100 in order to enter configuration data for supported controllers 132, etc. within their fleet(s). This data is eventually stored in TFL repository database 116.

TFL system 100 also includes a plurality of vehicles 128 (i.e., the "fleet" being remotely diagnosed, monitored and/or reprogrammed). (FIG. 1 shows only one vehicle 128 for ease of explanation herein.) Within each vehicle is a smart device onboard unit 130, explained in more detail below. In an embodiment of the present invention, the onboard units 130 have access to a plurality of controllers or discrete measurement points 132 (shown as controllers 132*a–n* in FIG. 1) found within the vehicle 128 (e.g., brake, engine, transmission, and various other vehicle electrical component controllers). Such access is though the vehicle data bus (not shown) of each of the vehicles 128. Further, the onboard units 130 include transceivers that communicate with a communications service provider. 126. Like the communications service module 122, the onboard units 130 are configured for the specific means of wireless mobile communications employed within TFL system 100 (e.g., satellite or terrestrial wireless).

More detailed descriptions of the TFL system 100 components, as well their functionality, are provided below.

III. On Board Units

Figure 2A:
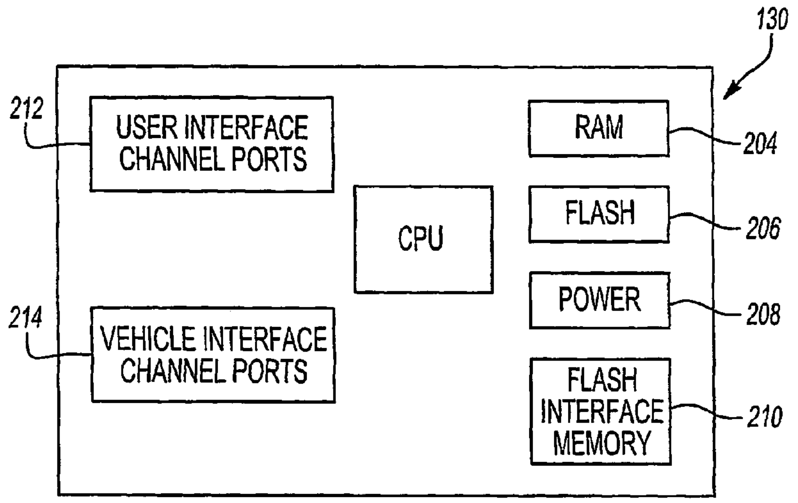
FIG. 2A is a block diagram of the physical architecture of an onboard unit according to a preferred embodiment of the present invention.

Referring to FIG. 2A, a block diagram of the physical architecture of the onboard unit 130, in a preferred embodiment of the present invention, is shown. The onboard unit 130 handles communications between the vehicle controllers 132 and the remainder of the TFL system 100.

In a preferred embodiment of the present invention, the onboard unit 130 is a small (e.g., 5"×6"×2") computer board which contains a 32-bit RISC architecture central processing unit (CPU) 202 such as the Intel® Strong ARM 32-bit chip, a 4 megabyte (MB) random access memory (RAM) 204, a 4 MB flash memory 206, a power supply 208, and a compact flash interface memory 210.

Further, onboard unit 130 also includes a user interface channel ports 212 and a vehicle interface channel ports 214. In an embodiment of the present invention, the user interface channel ports 212 contain interface modules for several wire and wireless mobile communications standard devices such as universal serial bus (USB), standard parallel ports, standard serial ports, satellite communications, code division multiple access (CDMA), time division multiple access (TDMA), the Bluetooth® wireless standard chip, intellect data bus (IDB), and the like. This would allow the TFL application service provider to utilize several of the available providers 126 to communicate with vehicles 128 in their subscriber's fleets.

In an embodiment of the present invention, the vehicle interface channel ports 214 contain interface modules for several standard automotive application program interfaces (API's). Such API's include *Serial Data Communications Between Microcomputer Systems in Heavy-Duty Vehicle Applications*, Document No. J1708, Society of Automotive Engineers (SAE) of Warrendale, Pa. (October 1993); *Joint SAE/TMC Electronic Data Interchange Between Microcomputer Systems in Heavy-Duty Vehicle Applications*, Document No. J1587, SAE (July 1998); and *Recommended Practice for Truck and Bus Control and Communications Network*, Document No. J1939, SAE (April 2000); all of which are incorporated herein by reference in their entirety. Other such API's include SAE's onboard diagnostic system (OBD) II standard and several vehicle manufacturer specific/proprietary interfaces and discrete measurement point interfaces.

Figure 2B:
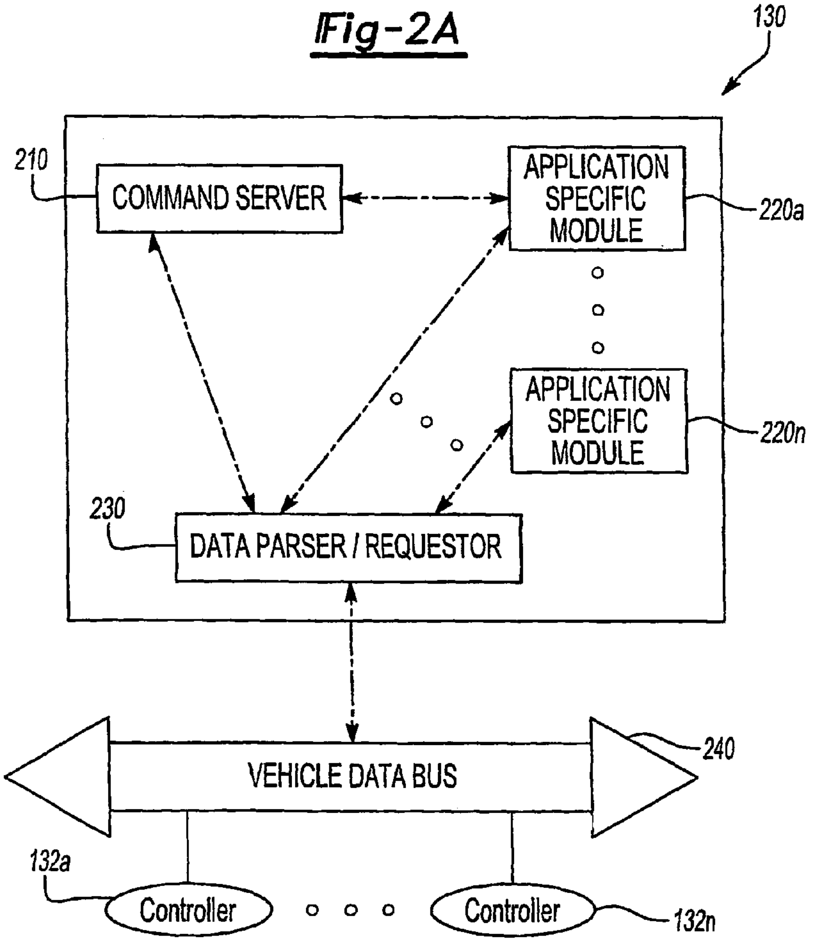
FIG. 2B is a block diagram of the software architecture of an onboard unit according to a preferred embodiment of the present invention.

Referring to FIG. 2B, a block diagram of the software architecture of the onboard unit 130, in a preferred embodiment of the present invention, is shown. Onboard unit 130 contains three main software modules, implemented in a high level programming language such as the C++ programming language, and executing on the CPU 202. These modules include a command server module 210, a plurality of application specific modules 220 (shown as application specific modules 220*a–n*), and a data parser/requester module 230.

The command server module 210 contains software code logic that is responsible for handling the receiving and transmitting of the communications from the provider 126 and relays such data to either the data parser/requester module 230 or to one of the application specific modules 220, as applicable.

The application specific modules 220 (one for each manufacturer specific controller 132 within the vehicle) each contain software code logic that is responsible for handling interfacing between the command server module 210 to the vehicle data bus 240 (via data parser/requestor module 230) for application specific (i.e., manufacturer specific) parameter readings, alerts, configuration or reprogramming data (as explained in detail below).

The data parser/requester module 230 contains software code logic that is also responsible for handling direct interfacing between the command server module 210 to the vehicle data bus 240 for non-application specific (i.e., "generic" SAE J1708 or SAE1939 discrete measurement points) parameter readings, alerts, configuration or reprogramming data (as explained in detail below).

In an embodiment of the present invention, the onboard unit 130 is designed to be compliant with the SAE's *Joint SAE/TMC Recommended Environmental Practices for Electronic Equipment Design* (*Heavy-Duty Trucks*), Document No. J1455 (August 1994) standard, which is incorporated herein by reference in its entirety, because it will be a component included (or installed) within vehicles 132. That is, the onboard unit 130 is physically mounted on the vehicle 128, electrically coupled to the vehicle data bus 240 via the wiring harness of the vehicle 128, and packaged in a manner that resists environmental seepage of dirt and moisture, as well as withstands operational vibration. Further, the onboard unit 130 must be built to withstand, in a preferred embodiment, industrial temperature ranges of −40 to 85 degrees centigrade.

In an alternate embodiment of the present invention, the onboard unit 130 would include a global positioning (GPS) receiver component, which would allow the TFL system 100 to provide location-based logistical management features to users 102.

More details of the onboard unit 130 architecture and functionality are provided below in connection with the description of the TFL system 100 operation.

IV. Detailed Example of System Operation

Figure 3:
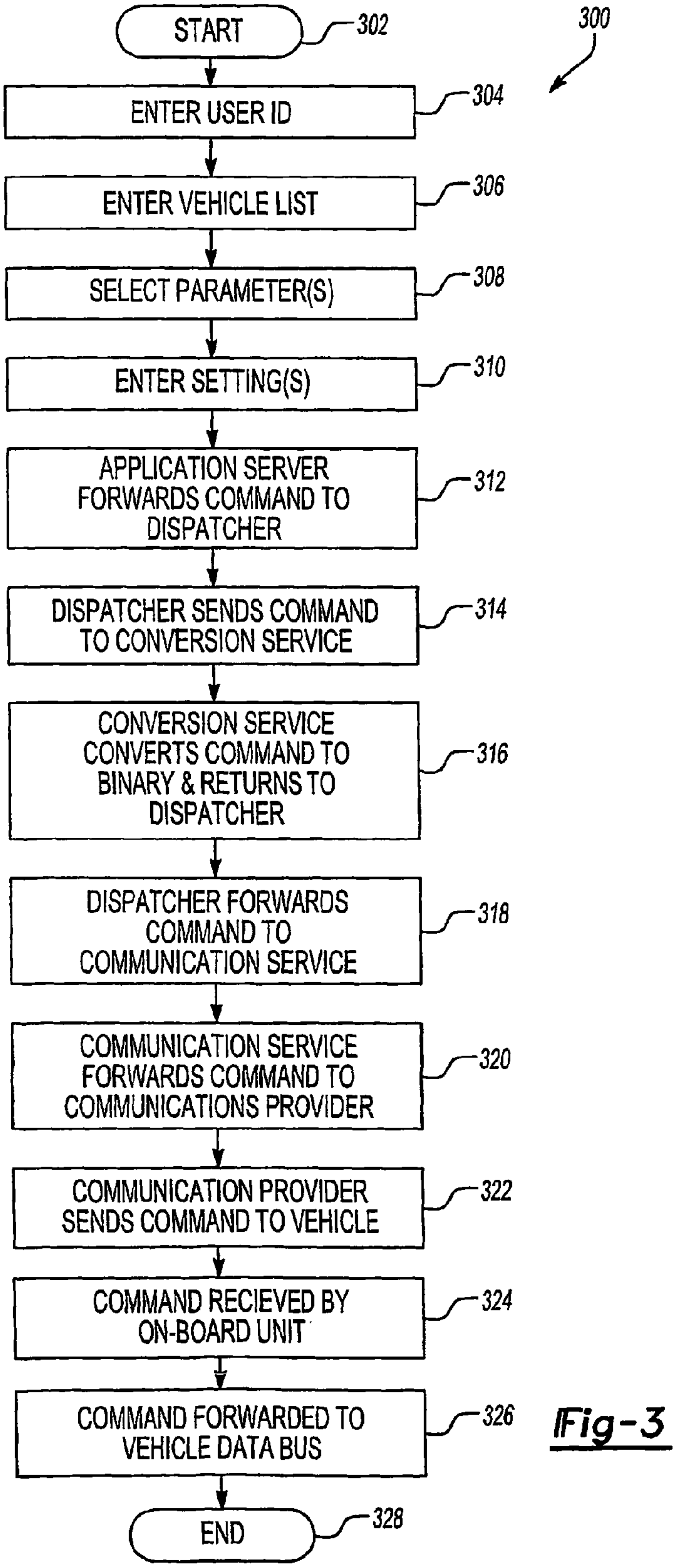
FIG. 3 is a flowchart depicting an embodiment of the operation and control flow of the remote vehicle diagnostics, monitoring and reprogramming tool of the present invention.

Referring to FIG. 3, a flow chart of a sample control flow 300, according to an embodiment of the present invention, is shown. More specifically, control flow 300 depicts a fleet manager user 102 reprogramming a fleet vehicle parameter with reference to the elements of TFL system 100 described above with reference to FIG. 1. (Also see FIG. 6 described below.) Control flow 300 begins at step 302, with control passing immediately to step 304.

In step 304, the user 102 enters their password in order to login into the TFL system 100. Such login would be provided by a Web page sent out over the Internet 104 (and accessed by user 102 using a PC or the like) by Web service 110. Subscriber information would be kept by the TFL application service provider in the TFL repository database 116.

After the user is logged in, in step 306, the user then enters their vehicle list selection. The vehicle choices (i.e., entire fleet(s), division(s) of vehicles within a fleet, or specific individual vehicles) available for selection are stored for each subscriber in the TFL repository database 116. Once presented with a GUI of available vehicles, in step 308, the user 102 would then enter the parameter(s) (e.g., max cruise speed) they would like to reprogram on the specific vehicle(s) selected in step 306. In step 310, the user 102 would enter the new setting(s) (e.g., 55 MPH) for the selected parameter(s).

In step 312, the application server 108 receives the settings and translates the reprogramming request into a list of commands—one command for each vehicle—and forwards these commands to the dispatcher module 120 located on the onboard unit (OBU) server 118. In step 314, the dispatcher 120 forwards each command to the conversion service 124. In step 316, the conversion service 124 translates the user entered setting(s) (e.g., "55 MPH") to a binary format understandable to the onboard unit 130 such that it can process the command according to the requirements of the targeted vehicle controller 132. This translation is facilitated by the relational database (as described above) located within the conversion service 124. Once translated, the command (now in binary) is sent back to the dispatcher 120.

In step 318, the conversion service 124 forwards the command to the communications service 122. In step 320, the communications service 122 further encodes and compresses the command (for efficiency of transmission), and routes the command, (passing the firewall 106 and) via the Internet 104, to the communications provider 126. In step 322, the communications provider 126 forwards the command to the onboard unit 130 on the vehicle 128.

As mentioned above, step 322 may be accomplished, depending on the embodiment of the present invention (i.e., according to the provider 126 selected by or available to the TFL application service provider), via any wire or wireless mobile communications standard such as USB, parallel ports, serial ports, satellite communications, CDMA, TDMA, the Bluetooth® wireless standard, IDB, and the like.

In an embodiment of the present invention, more than one communication service provider 126 (and thus more than one means of mobile communications) would be utilized by the TFL application service provider in order to maximize the number of different vehicles 128 belonging to different subscribers 102 that may be diagnosed, monitored and/or reprogrammed by the TFL system 100. Consequently, the OBU server 118 would contain multiple communications service 122 modules, each configured for specific communication service provider 126.

In step 324, the command is received by the command server module 210 executing on the CPU 202 of the onboard unit 130. In step 326, the command is forwarded to the vehicle data bus 240 by the data parser requester module 230 executing on the CPU 202 of the onboard unit 130. The command thus finally reaches the appropriate controller 132 within the vehicle 128. Control flow 300 then ends as indicated by step 328.

As will be apparent to one skilled in the relevant art(s) after reading the above, an acknowledgment of the reprogramming command from the vehicle 128 to the user 102 would flow in the reverse direction from control flow 300. Further, the acknowledgment would be stored in database 116 for the user 102 to (later) retrieve.

It should be understood that control flow 300, which highlights the reprogramming functionality of TFL system 100, is presented for example purposes only. The software architecture of the present invention is sufficiently flexible and configurable such that users 102 may navigate through the system 100 in ways other than that shown in FIG. 3.

V. Graphical User Interface

As mentioned above, the application server 108 will provide a GUI for users 102 (e.g., fleet managers, vehicle distributors, OEMs, vehicle dealers and the like) to enter inputs and receive the outputs as described, for example, in control flow 300. In an embodiment of the present invention, the GUI screens of the present invention may be classified into three categories: alerts (e.g., threshold alerts, tamper warnings, etc.), parameter readings, and reprogramming. FIGS. 4–6, presented below, show examples GUI screens reflecting these three categories respectively. They also highlight the functionality and features of TFL system 100 in general.

Figure 4A:
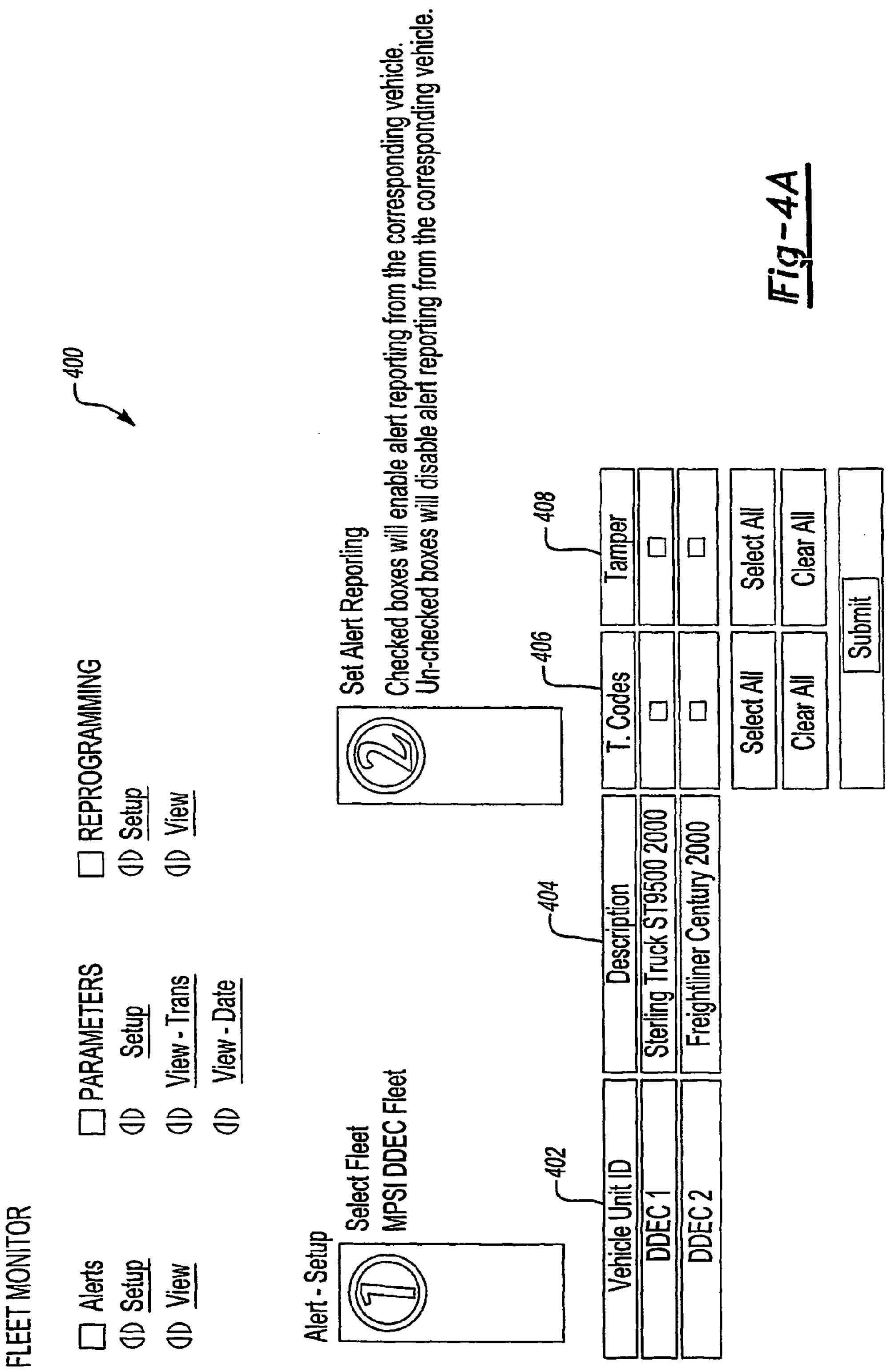

Referring to FIG. 4A, a "set alert" GUI screen 410 with representative data, according to an embodiment of the present invention, is shown. Screen 400 includes a column 402 labeled "Vehicle Unit ID" which indicates the vehicles within a fleet the user 102 has previously selected to receive alerts for. Screen 400 includes a column 404 labeled "Description" which indicates the type of vehicle 128 corresponding the Vehicle Unit ID in column 402. Screen 400 also includes a column 406 labeled "T. Codes" which is a check box the user 102 can select to indicate that they wish to track alert codes for all available parameters within a specific vehicle 128. Lastly, screen 400 includes a column 408 labeled "Tamper" which is a check box the user 102 can select to indicate whether they wish to track whether any parameter within a specific vehicle 128 has been physically tampered with.

Figure 4B:
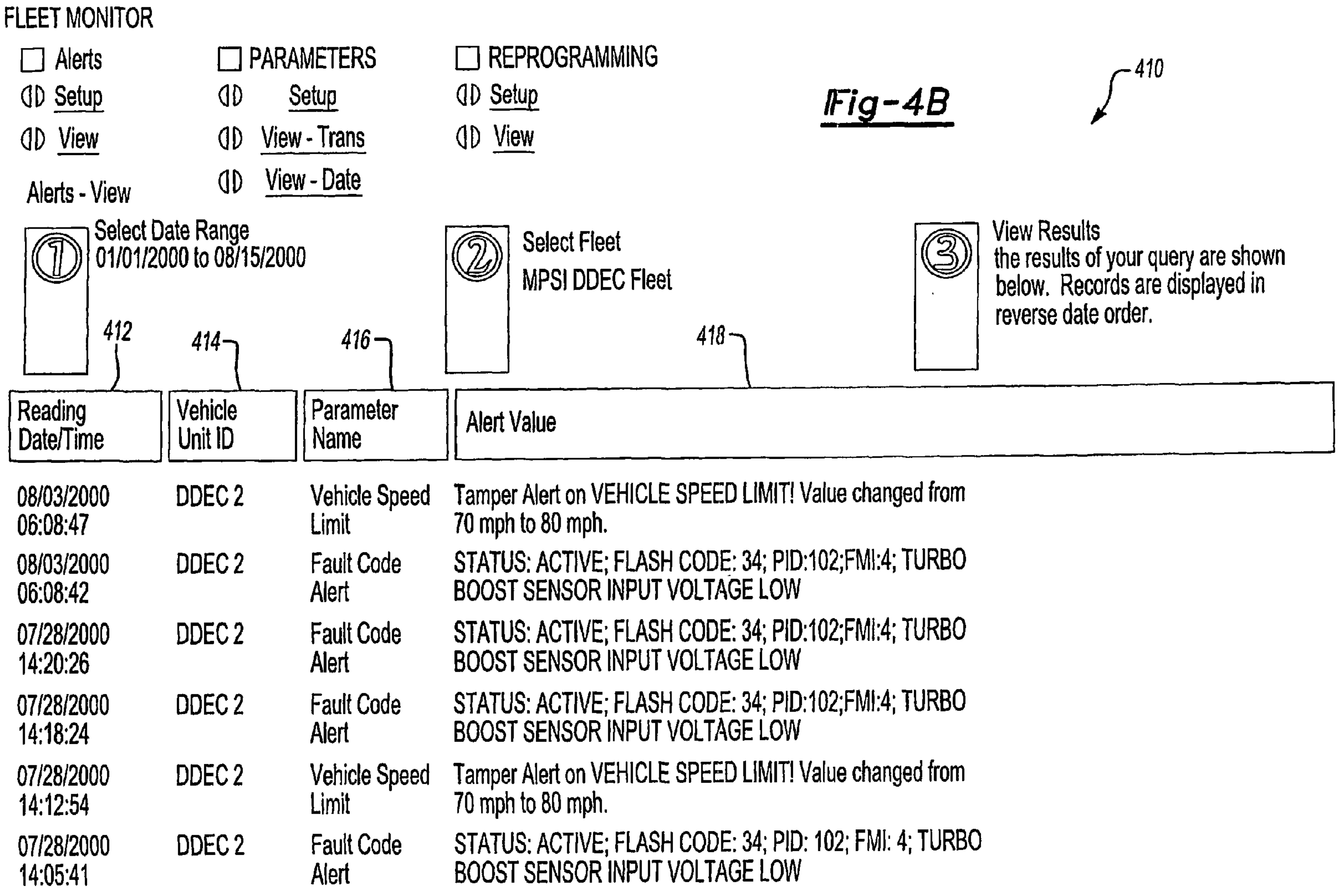

Referring to FIG. 4B, a "view alert" GUI screen 410 with representative data, according to an embodiment of the present invention, is shown. Screen 410 includes a column 412 labeled "Reading Date/Time" which indicates the actual date and time a particular alert was generated for a particular vehicle specified in a column 414 labeled "Vehicle ID." In a column 416, the parameter name (e.g., vehicle speed limit) for which the alert was generated is displayed. Screen 410 also includes a column 418 labeled "Alert Value," where a description of the alter is displayed.

Figure 5A:
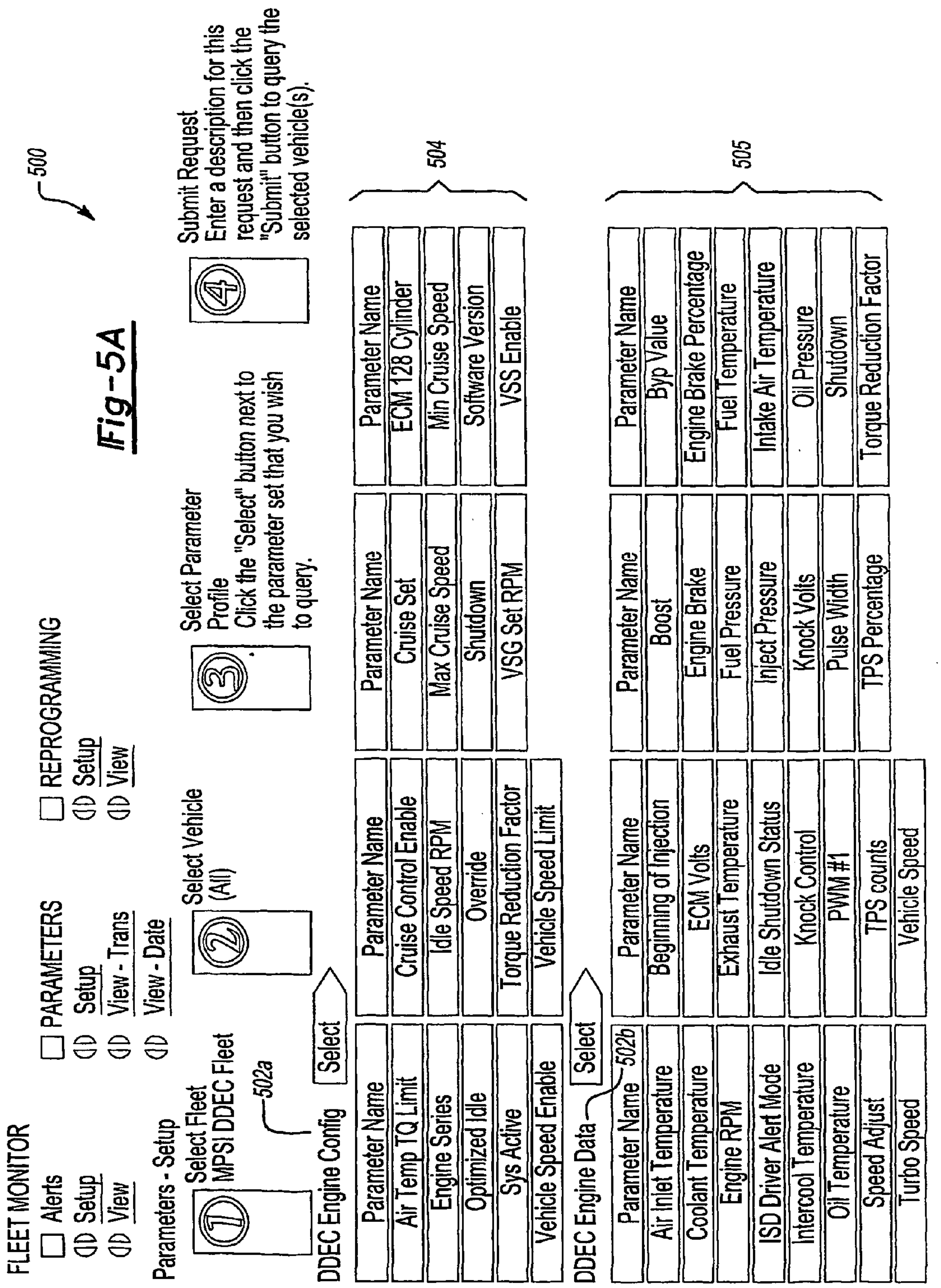

Referring to FIG. 5A, a "select parameter" GUI screen 500, according to an embodiment of the present invention, is shown. Screen 500 includes four categories 502*a–d* of parameters a user 102 may select. Within each category 502, there are specific vehicle parameters 504*a–d* that the user 102 may choose from. Selected parameters 504 or categories of parameters 502 will result in the TFL system 100 system obtaining these parameter readings from each of the vehicles 128 that the user 102 has previously selected.

Figure 5B:
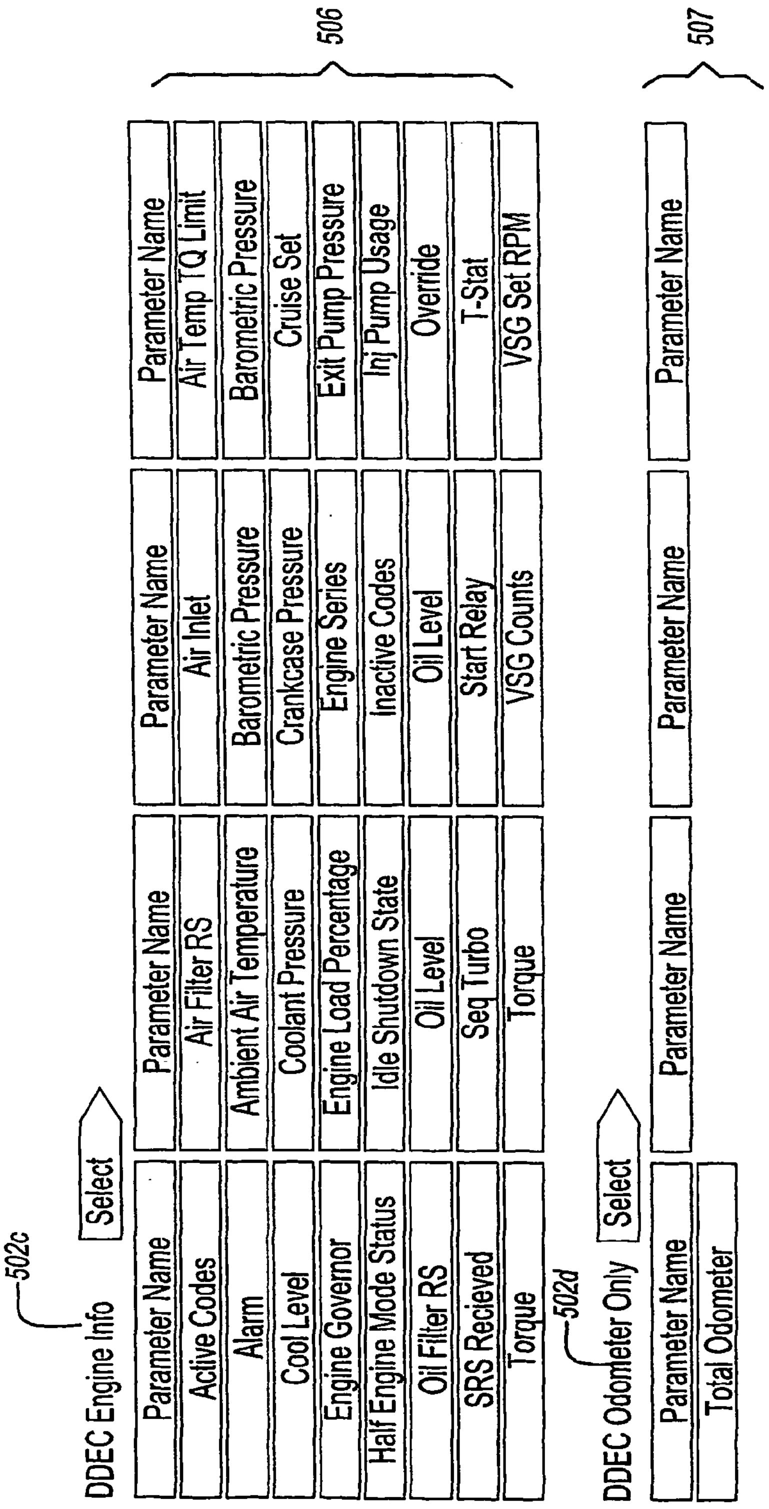

Referring to FIG. 5B, a "select parameter transactions" GUI screen 510 with representative data, according to an embodiment of the present invention, is shown. Screen 510 includes a column 512 labeled "Transaction Description." This column indicates the names of the different transactions created by one or more users 102 which manage the same fleet of vehicles. In an embodiment of the present invention, a "transaction" is a section of different parameter categories 502 and/or specific vehicle parameters 504 selected by a user 102 using screen 500 and saved in the TFL system 100 using a "transaction" name shown in column 512 of screen 510. A column 513 indicates the ID (i.e., login name) of the particular user 102 which created the transaction. A column 514 indicates the date that the user 102 created the transaction. A column 516 labeled "Param Profile Requested" indicates the category 502 of parameters that the user 102 selected in GUI screen 500 for the corresponding transaction. A column 518 allows the user 102 to select the transactions they would like to view for the specific vehicles 128 previously selected.

Referring to FIG. 5C, a "view parameter results" GUI screen 520, according to an embodiment of the present invention, is shown. Screen 520 includes a column 522 labeled "Vehicle Unit ID" which indicates the vehicles within a fleet the user 102 has previously selected to receive parameter readings from. Screen 520 also includes several parameter reading columns 524 which indicate the parameter values read from the selected vehicles 128 and correspond to the transaction selected by a user 102 using the select buttons in column 518 on screen 510.

Figure 6A:
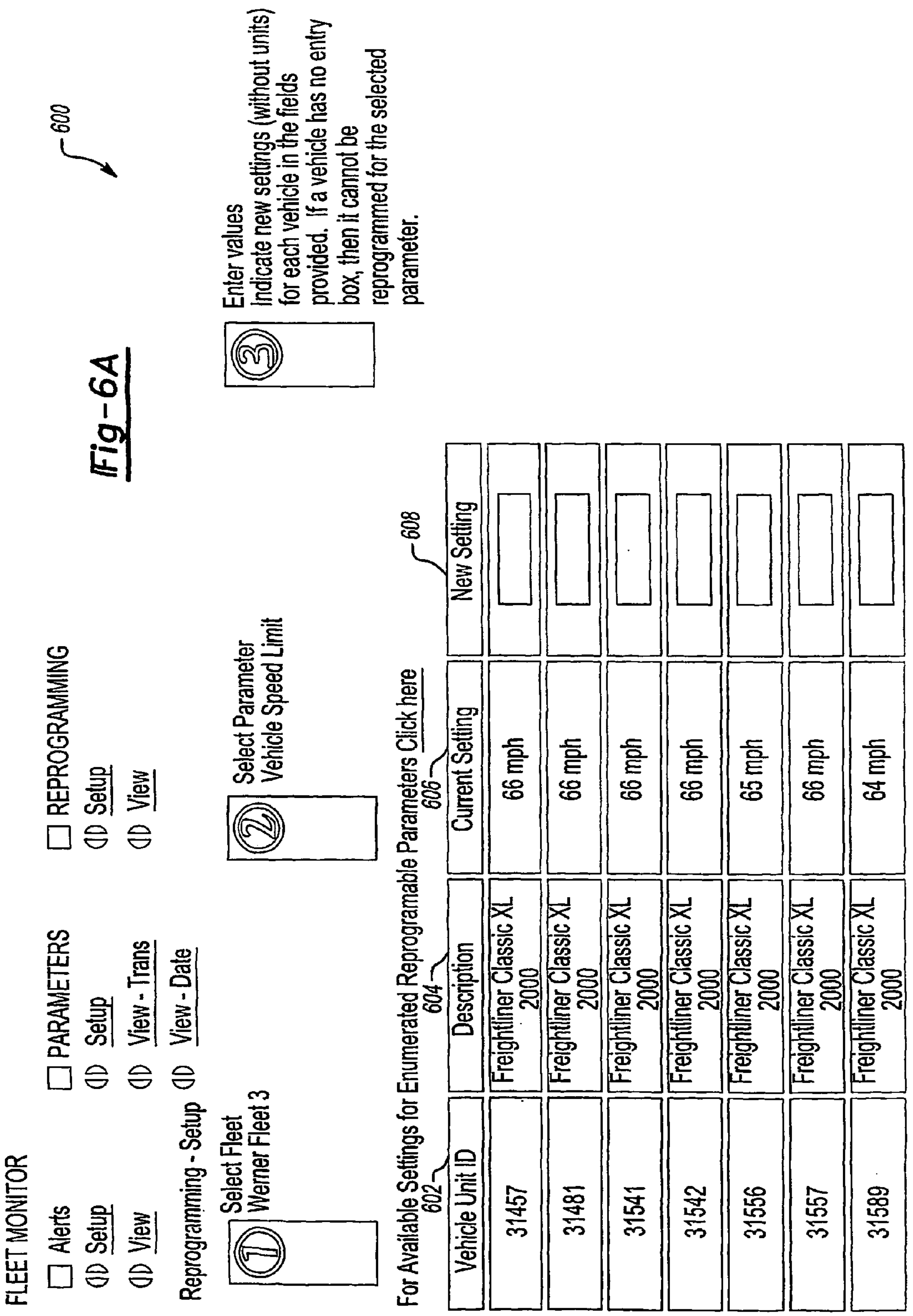

Referring to FIG. 6A, an "enter parameter values for reprogramming" GUI screen 600, according to an embodiment of the present invention, is shown. Screen 600 includes a column 602 labeled "Vehicle Unit ID" which indicates the vehicles within a fleet the user 102 has previously selected to reprogram. (See control flow 300 described above with reference to FIG. 3.) Screen 600 includes a column 604 labeled "Description" which indicates the type of vehicle 128 corresponding the Vehicle Unit ID in column 602. Screen 600 also includes a column 606 labeled "Current Setting" which indicates the current value of the previously selected parameter that user 102 desires to reprogram (i.e., change). Lastly, screen 600 includes a column 608 labeled "New Setting" which is an input box where the user can enter a new value for the previously selected vehicle 128 parameter.

Referring to FIG. 6B, a "view reprogramming results" GUI screen 610, according to an embodiment of the present invention, is shown. Screen 610 includes a column 612 labeled "Vehicle" which indicates the vehicles 132 within a fleet the user 102 has previously selected to reprogram. A column 614 indicates the name of the previously selected vehicle parameter for which status information is now being viewed by user 102. A column 616 indicates the date and time that the user 102 submitted the reprogramming request using screen 600. A column 618 labeled "Current" indicates the present value (at last reading and presently stored in repository 116) for the corresponding vehicle parameter shown in column 614. A column 620 labeled "Requested" indicates the new reprogrammed value requested by user 102 using column 608 of screen 600. Screen 610 also includes a column 622 labeled "Status" which indicates the current status (as read from the vehicle 128) of the reprogramming command sent by the TFL system 100.

It should be understood that the screens shown in this section (i.e., FIGS. 4–6), which highlights the functionality of TFL system 100, are presented for example purposes only. The software architecture (and thus, GUI screens) of the present invention is sufficiently flexible and configurable such that users 102 may navigate through the system 100 in ways other than those shown in FIGS. 4–6. Further, the information described therein can be presented to the user 102 in ways other than shown in FIGS. 4–6.

In an embodiment of the present invention, reprogramming commands to be sent to specific vehicles 128 and parameter readings to be read from specific vehicles 128 can be scheduled by the TFL system 100. That is, the user 102 may specify, for example, pre-defined time periods that parameter readings should be taken for specific vehicles within a fleet. Such pre-defined time periods can be hourly, daily, x times per day, weekly, y times per week, monthly, etc.

VI. Example Implementations

Figure 7:
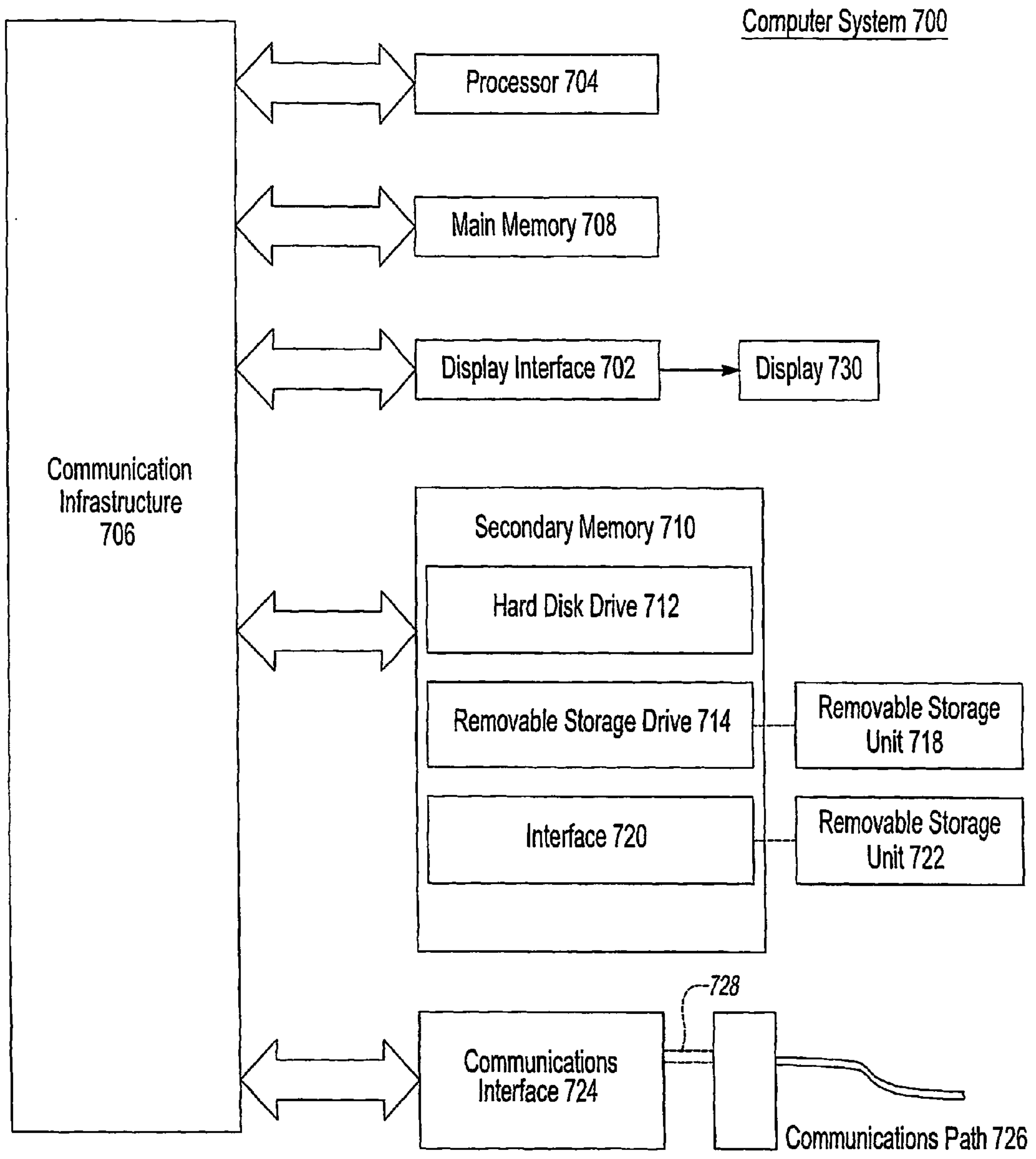
FIG. 7 is a block diagram of an exemplary computer system useful for implementing the present invention.

The present invention (i.e., TFL system 100, onboard unit 130, control flow 300, and/or any part(s) thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 700 is shown in FIG. 7. The computer system 700 includes one or more processors, such as processor 704. The processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 700 can include a display interface 705 that forwards graphics, text, and other data from the communication infrastructure 702 (or from a frame buffer not shown) for display on the display unit 730.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718, represents a floppy disk, magnetic tape, optical disk, etc. which is read by and written to by removable storage drive 714. As will be appreciated, the removable storage unit 118 includes a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path (i.e., channel) 726. This channel 726 carries signals 728 and may be implemented using wire or cable, fiber optics, a phone line, a cellular phone link, an RF link and other communications channels.

In this document, the terms "computer program medium" and "computer usable medium" are used to generally refer to media such as removable storage drive 714, a hard disk installed in hard disk drive 712, and signals 728. These computer program products are means for providing software to computer system 700. The invention is directed to such computer program products.

Computer programs (also called computer control logic) are stored in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A system for allowing a user to perform remote vehicle diagnostics, vehicle monitoring, vehicle configuration and vehicle reprogramming for at least one vehicle, comprising:

an onboard unit coupled to a data bus of the at least one vehicle, wherein the onboard unit is operable to exchange with the data bus telemetry data that is in a format native to at least one vehicle controller coupled to the data bus, and wherein the onboard unit includes a first communication means that is operable to exchange the telemetry data over a first network;

a server comprising:

- a second communications means that is operable to exchange the telemetry data with the onboard unit via the first network;
- an onboard-unit server that is operable to convert the telemetry data between the native format and a human readable format so as to provide converted telemetry data;
- a repository database for holding information indicative of at least one of the vehicles;
- an application server, coupled to the onboard-unit server and the repository database, having at least one application for carrying out at least one of vehicle diagnostics, vehicle monitoring, vehicle configuration and vehicle reprogramming, wherein the application server is operable to carry out decision processing of the at least one application to generate processed information as a function of at least a portion of the information from the repository database and the converted telemetry data; and
- a network interface that is operable to exchange with at least one application the processed information, and responsive to a user request, provide at least a portion of the processed information and converted telemetry data over a second network;

a graphical-user interface coupled to the network interface via the second network, wherein graphical-user interface is operable to submit the user request, exchange with the network interface at least a portion of the processed information and the converted telemetry data responsive to the request, and display at least a portion of the processed information and the converted telemetry data to the user;

wherein at least the application server is provided by an application service provider; and wherein the user is charged a fee by the application service provider.

2. The system of claim 1, wherein the at least one vehicle includes at least one of the group consisting of (i) passenger cars; (ii) light trucks; (iii) vans; (iv) heavy trucks, and (v) other movable vehicles.

3. The system of claim 2, wherein at least a portion of the second communications means includes any wire or wireless mobile communications.

4. The system of claim 1, wherein the first network includes at least one path routed through the Internet.

5. The system of claim 1, wherein the telemetry data is in binary format.

6. The system of claim 1, wherein the system provides total fleet logistics via the GUI by facilitating vehicle parameter changes, vehicle health tracking, and receipt of vehicle maintenance need indications, thereby eliminating a need to physically bring the one or more vehicles to repair, maintenance, or configuration facility.

7. The system of claim 1, wherein onboard unit comprises an application module, a data-interface module, and a command module.

8. The system of claim 7, wherein, the application module is operable to collect telemetry data for any of the applications, and manage interfacing between the data bus and the command module for collecting the telemetry data; wherein the data interface module is operable to manage interfacing between the data bus, the application and command modules; and wherein the command module is operable to manage telemetry data sent to and from the onboard unit, and direct the telemetry data to the data-bus interface and application module.

9. The system of claim 8, wherein the onboard-unit server includes a dispatcher module, a conversion module, and a communication module, wherein the dispatcher module is operable to route the telemetry data between the communication and conversion modules, wherein the communication module is operable to manage telemetry data sent to and from the onboard-unit server, and wherein the conversion module is operable to convert telemetry data between the native format and a format understandable by the user using the GUI.

10. The system of claim 1, wherein the onboard-unit server includes a dispatcher module, a conversion module, and a communication module, wherein the dispatcher module is operable to route the telemetry data between the communication and conversion modules, wherein the communication module is operable to manage telemetry data sent to and from the onboard-unit server, and wherein the conversion module is operable to convert telemetry data between the native format and a format understandable by the user using the GUI.

11. The system of claim 1, further including a firewall, wherein appropriate credentials are required to access to the application server and repository database.

12. The system of claim 1, wherein the information indicative of the at least one vehicle includes a vehicle identification parameter and at least one parameter that is specific to the applications.

13. The system of claim 1, wherein the telemetry data sent to and received from each of the at least one vehicle includes telemetry data specific to the applications.

14. The system of claim 1, wherein the information indicative of the at least one vehicle includes a vehicle identification parameter and at least one parameter that is not specific to the applications.

15. The system of claim 1, wherein the telemetry data sent to each of the at least one vehicle contain commands for collecting data.

16. The system of claim 1, wherein the telemetry data sent to each of the at least one vehicle contains at least one command for setting a parameter of the vehicle.

17. The system of claim 1, wherein to carry out the decision processing the application server accesses the repository database to obtain the information about at least one vehicle.

18. The system of claim 17, wherein during processing of applications telemetry data is exchanged with at least one of the vehicles.

19. The system of claim 1, wherein the application server includes a web server, and wherein the graphical user interface accesses the application server via the web server.

20. The system of claim 1, wherein the application server includes a web server, and wherein the GUI accesses the application server via the web server.

21. The system of claim 1, wherein the graphical user interface uses a web browser to access the application server.

22. The system of claim 21, wherein the graphical user interface is not provided by the application service provider.

23. The system of claim 1, wherein the onboard unit server and application server are provided by an application service provider.

24. The system of claim 23, wherein the application server includes a web server, and wherein the graphical user interface accesses the application server via the web server.

25. The system of claim 24, wherein the graphical user interface uses a web browser to access the application server.

26. The system of claim 1, wherein the onboard unit server, application server, and graphical user interface are provided as a locally-based standalone system.

27. The system of claim 26, wherein the application server includes a local area network (LAN) server, and wherein the graphical user interface accesses the application server via the LAN server.

28. The system of claim 27, wherein the graphical user interface uses a browser to access the application server.

29. A system for a vehicle onboard unit that allows a user to perform remote vehicle diagnostics, vehicle monitoring, vehicle configuration and vehicle reprogramming, wherein the vehicle onboard unit is coupled to a data bus of a vehicle, the system comprising:

a central processing unit (CPU);

vehicle input/output (I/O) channel ports for exchanging with the data bus telemetry data that is in a format native to at least one vehicle controller coupled to the data bus, and for exchanging the telemetry data over a first network;

a first application program interface means, executable by the CPU, for converting the telemetry data between the native format and a human readable format so as to provide converted telemetry data;

at least one application server, executable by the CPU, for carrying out at least one of vehicle diagnostics, vehicle monitoring, vehicle configuration and vehicle reprogramming, wherein the at least one application is operable to carry out decision processing to generate processed information as a function of at least a portion of information that is obtained from a repository database and the converted telemetry data, wherein the information is indicative of the vehicle;

user input/output (I/O) channel ports for exchanging with the at least one application the processed information, and exchanging with a graphical-user interface means via a second network a user request for the processed information and the converted telemetry data;

a second application program interface means, executing on said CPU, for extracting a command from user request exchanged with the user I/O channel ports, wherein said command includes information specifying a vehicle and at least one vehicle parameter associated with the vehicle; exchanging with the graphical-user-interface means at least a portion of the processed information and converted telemetry data responsive to the request wherein the system allows the user to perform total fleet logistics via the graphical-user-interface means by facilitating vehicle parameter changes, vehicle health tracking, and receipt of vehicle maintenance need indications, thus eliminating the need to physically bring said vehicle to a repair, maintenance or configuration facility;

wherein at least the application server is provided by an application service provider; and wherein the user is charged a fee by the application service provider.

30. The system of claim 29, wherein the second application program interface means includes means for extracting the command from one of the following types of communications exchanged via the user I/O channel ports: (i) satellite communications; (ii) code division multiple access (CDMA) communications; (iii) time division multiple access (TDMA) communications; (iv) wireless local area network communications; (v) wired local area network communications; (vi) controller area network communications; and (vii) wireless wide area network communications.

31. A method for allowing a user to perform remote diagnostics, monitoring configuring, and reprogramming for a fleet of vehicles, comprising:

accessing a repository database using a graphical user interface (GUI) via a first network, wherein the repository database provides a list of vehicles within the fleet of vehicles and a list of associated vehicle parameters;

selecting, via the GUI, at least one vehicle from the list of vehicles, and one vehicle parameter from the list of associated vehicle parameters for each of the at least one vehicle;

receiving from the GUI, via the first network, a command requesting an application server to process at least one application for carrying out any of vehicle diagnostics, vehicle monitoring, vehicle configuration and vehicle reprogramming, wherein the command includes information specifying the at least one vehicle from the list of vehicles, and one vehicle parameter from the list of associated vehicle parameters for each of the at least one vehicle, wherein the application server is provided by an application service provider and wherein the user is charged a fee by the application service provider;

storing the command with the time and date that the command was received in the repository database;

responsive to the command, processing at least one application for converting the command from a format understandable by the GUI to telemetry data that is in a format native to at least one onboard unit located on said at least one vehicle;

sending the telemetry data, via a wireless mobile communications system over a second network to cause the at least one vehicle parameter to be read or changed;

receiving from said onboard unit, via the wireless mobile communications system, an acknowledgment of the at least one vehicle parameter being read or changed; and storing the acknowledgment in the repository database so that the GUI may later retrieve the acknowledgment using the GUI responsive to a user request send via the second network, sending to the GUI via the second network the acknowledgment for display; whereby the method allows the user to perform total fleet logistics by facilitating vehicle parameter changes, vehicle health tracking, and receipt of vehicle maintenance need indications, thus eliminating the need to physically bring vehicle's within the fleet to a repair, maintenance, or configuration facility.

32. The method of claim 31 wherein the first network includes at least a one path routed through the Internet.

33. The method of claim 31, wherein at least a portion of the wireless mobile communications system includes at least one of the following:

(i) a satellite communication device;

(ii) code division multiple access (CDMA) communication device;

(iii) time division multiple access (TDMA) communication device; and (iv) a wireless local area network communications;

(v) a wired local area network communication device; and (vi) a wireless wide area network communication device.

34. A computer program product comprising a computer usable medium having control logic stored therein for carrying out the method of claim 31.

35. A system for allowing a user to perform remote vehicle diagnostics, vehicle monitoring, vehicle configuration and vehicle reprogramming for at least one vehicle, comprising:

an onboard unit coupled to the data bus of the at least one vehicle, wherein the onboard unit is operable to exchange with the data bus telemetry data that is in a format native to at least one vehicle controller coupled to the data bus, and wherein the onboard unit includes a first communication means that is operable to exchange the telemetry data over a first network;

a server comprising:

a second-communications means that is operable to exchange the telemetry data with the onboard unit via the first network;

an onboard-unit server that is operable to convert the telemetry data between its native format and a human readable format so as to provide converted telemetry data;

a repository database for holding information indicative of at least one of the vehicles;

an application server, coupled to the onboard-unit server and the repository database, having at least one application for carrying out at least one of vehicle diagnostics, vehicle monitoring, vehicle configuration and vehicle reprogramming, wherein the application server is operable to carry out decision processing of the at least one application to generate processed information as a function of at least a portion of the information from the repository database and the converted telemetry data; and a network interface that is operable to exchange with at least one application the processed information, and responsive to a user request, provide at least a portion of the processed information and the converted telemetry data over a second network;

a graphical-user interface coupled to the network interface via the second network, wherein graphical-user interface is operable to submit the user request, exchange with the network interface at least a portion of the processed information and the converted telemetry data responsive to the request, and display at least a portion of the processed information and converted telemetry data to the user;

wherein at least the application server is provided by an application service provider; and wherein the application service provider charges a subscription for carrying out the at least one application.

* * * * *